US011432229B2

(12) United States Patent
Ozturk et al.

(10) Patent No.: US 11,432,229 B2
(45) Date of Patent: Aug. 30, 2022

(54) IDENTIFICATION OF CELLS IN NEW RADIO UNLICENSED

(71) Applicant: QUALCOMM Incorporated, San Diego, CA (US)

(72) Inventors: Ozcan Ozturk, San Diego, CA (US); Andrei Dragos Radulescu, San Diego, CA (US); Aleksandar Damnjanovic, Del Mar, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 16/592,517

(22) Filed: Oct. 3, 2019

(65) Prior Publication Data

US 2020/0112911 A1 Apr. 9, 2020

Related U.S. Application Data

(60) Provisional application No. 62/742,023, filed on Oct. 5, 2018.

(51) Int. Cl.
*H04W 48/12* (2009.01)
*H04W 72/08* (2009.01)
*H04W 72/04* (2009.01)

(52) U.S. Cl.
CPC ......... *H04W 48/12* (2013.01); *H04W 72/042* (2013.01); *H04W 72/0413* (2013.01); *H04W 72/0426* (2013.01); *H04W 72/085* (2013.01)

(58) Field of Classification Search
CPC . H04W 48/12; H04W 72/085; H04W 72/042; H04W 72/0426; H04W 72/0413; H04W 16/14; H04W 24/02; H04W 24/10; H04J 11/0069
See application file for complete search history.

(56) References Cited

U.S. PATENT DOCUMENTS

| 9,220,055 B2 * | 12/2015 | Shin ..................... H04W 48/16 |
| 2010/0234016 A1 | 9/2010 | Palanki et al. |
| 2015/0172950 A1 | 6/2015 | Chen et al. |
| 2017/0308962 A1 * | 10/2017 | Raskin ................ G06F 16/3326 |
| 2017/0359737 A1 | 12/2017 | Singh et al. |

FOREIGN PATENT DOCUMENTS

AU 2008341302 A1 * 7/2009 ............ H04W 80/02

OTHER PUBLICATIONS

International Search Report and Written Opinion—PCT/US2019/054713—ISA/EPO—dated Dec. 20, 2019 (185346WO).

* cited by examiner

*Primary Examiner* — Walter J Divito
(74) *Attorney, Agent, or Firm* — Liem T. Do

(57) ABSTRACT

Methods, systems, and devices for wireless communications are described. A base station may identify a globally unique set of characteristics associated with a cell associated with the base station. The base station may generate a signature value unique to the cell based at least in part on a hash of the globally unique set of characteristics associated with the cell. The base station may transmit a control signal over a channel of a shared radio frequency spectrum band, the control signal comprising a physical cell identifier of the cell and the signature value.

24 Claims, 15 Drawing Sheets

IDENTIFICATION OF CELLS IN NEW RADIO UNLICENSED

CROSS REFERENCE

The present application for patent claims the benefit of U.S. Provisional Patent Application No. 62/742,023 by OZTURK, et al., entitled "IDENTIFICATION OF CELLS IN NEW RADIO UNLICENSED," filed Oct. 5, 2018, assigned to the assignee hereof, and expressly incorporated herein.

BACKGROUND

The following relates generally to wireless communications, and more specifically to identification of cells in new radio (NR) unlicensed.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as NR systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may be deployed in a variety of different manners, in different environments, by different network operators, etc. For example, deployment may be coordinated, partially coordinated, or completely uncoordinated. Coordination may be within the network operators deploying the wireless network and/or between network operators deploying their own respective wireless networks. Even within a single network operator, the deployment may be ad-hoc, e.g., without a central entity controlling configuration and operation of the base stations. Moreover, wireless networks may be deployed in a licensed environment and/or may be deployed in environment that uses a shared or unlicensed radio frequency spectrum band. In some instances, such deployments may result in two or more cells associated with different base stations being configured with the same identifier, e.g., with the same physical cell identity (PCI). Generally, the PCI may be used by UEs to differentiate cells, such as while performing channel measurements. This problem may be referred to as PCI confusion and/or PCI collision and may negatively impact wireless communications between base stations/cells, between base stations/cells and the UE, and the like. Accordingly, there is a need for mechanism that improves detection and mitigation of PCI confusion/collision in a wireless network, but without requiring communicating the full cell identity at the physical layer.

SUMMARY

The described techniques relate to improved methods, systems, devices, and apparatuses that support identification of cells in new radio (NR) unlicensed. Generally, the described techniques provide a mechanism for improved detection and mitigation of the situation where base stations are deployed in a shared or unlicensed radio frequency spectrum band. Broadly, aspects of the described techniques utilize a set of global characteristics that are unique for a cell belonging to a base station to create a signature value that can only be unique to that particular cell. The signature value, which is substantially smaller in terms of data size, may be communicated in a control signal (e.g., over a physical channel) to support differentiating cells within the wireless network. This may help identify and mitigate the situation where multiple cells associated with different base stations are configured with the same identifier, such as the same physical cell identity (PCI). For example, each base station that is operating in a shared or unlicensed radio frequency spectrum band may identify a globally unique set of characteristics that are associated with its cell(s). Broadly, the set of characteristics generally refers to any configured feature, parameter, record, and the like, that is associated with the cell. Examples of the characteristics may include, but are not limited to, the PCI of the cell, the network operator (e.g., the public land mobile network (PLMN) or PLMN ID or a combination of a PLMD ID and a second identifier or a completely different identifier), the bandwidth or sub carrier the cell is using, and the like. The base station/cell may generate a signature value that is unique to that cell by hashing one or more of the characteristics. The base station/cell may transmit a control signal over the shared or unlicensed radio frequency spectrum band that carries or otherwise conveys an indication of the signature value generated by the hash and, in some examples, an identifier of the cell (e.g., such as the PCI of the cell).

UEs operating in a wireless network may monitor for, or otherwise receive, control signals from the serving base station/cell as well as neighboring base station(s)/cell(s). Generally, each control signal may carry or otherwise convey the indication of the signature value for the respective cell and, in some examples, the respective PCI. The UEs may perform various channel measurements on the channel between the UE and the serving base station/cell and/or the UE and one or more neighboring base station(s)/cell(s). The UEs may transmit a feedback report to their respective serving base station that carries or otherwise conveys an indication of the result of the channel measurement procedure, e.g., a performance measurement result for the channel between the UE and the serving base station and/or the UE and neighboring base station(s)/cell(s). Generally, the feedback report may, for each respective base station/cell, carry or otherwise convey an indication of the PCI (when signaled) and the signature value for the respective cell.

Accordingly, the signature value may provide a relatively low data payload mechanism that enables the UE to distinguish between cells and, when more than one cell uses the same PCI, to detect and mitigate duplication of the PCI. For example, the serving base station of the UE may receive a feedback report that indicates that a cell belonging to the neighbor base station has a PCI that is the same as a PCI of a cell belonging to the serving base station and/or a different neighboring base station. The serving base station may update (e.g., change) its own PCI and/or coordinate with neighboring base station(s) (e.g., over the wireless network and/or via backhaul interface) to update their respective PCI.

A method of wireless communications at a base station is described. The method may include identifying a globally unique set of characteristics associated with a cell associated with the base station, generating a signature value unique to the cell based on a hash of the globally unique set of characteristics associated with the cell, and transmitting a control signal over a channel of a shared radio frequency spectrum band, the control signal including a PCI of the cell and the signature value.

An apparatus for wireless communications at a base station is described. The apparatus may include a processor, memory in electronic communication with the processor, and instructions stored in the memory. The instructions may be executable by the processor to cause the apparatus to identify a globally unique set of characteristics associated with a cell associated with the base station, generate a signature value unique to the cell based on a hash of the globally unique set of characteristics associated with the cell, and transmit a control signal over a channel of a shared radio frequency spectrum band, the control signal including a PCI of the cell and the signature value.

Another apparatus for wireless communications at a base station is described. The apparatus may include means for identifying a globally unique set of characteristics associated with a cell associated with the base station, generating a signature value unique to the cell based on a hash of the globally unique set of characteristics associated with the cell, and transmitting a control signal over a channel of a shared radio frequency spectrum band, the control signal including a PCI of the cell and the signature value.

A non-transitory computer-readable medium storing code for wireless communications at a base station is described. The code may include instructions executable by a processor to identify a globally unique set of characteristics associated with a cell associated with the base station, generate a signature value unique to the cell based on a hash of the globally unique set of characteristics associated with the cell, and transmit a control signal over a channel of a shared radio frequency spectrum band, the control signal including a PCI of the cell and the signature value.

Some examples of the method, apparatuses, and non-transitory computer-readable medium described herein may further include operations, features, means, or instructions for receiving a feedback report from a UE indicating a performance measurement result for a channel between the UE and a neighbor cell associated with a neighbor base station, the feedback report further indicating a second PCI and a second signature value associated with the neighbor cell.

Some examples of the method, apparatuses, and non-transitory computer-readable medium described herein may further include operations, features, means, or instructions for changing, based on the second PCI, the second signature value, or a combination thereof, the PCI associated with the cell to a different value.

Some examples of the method, apparatuses, and non-transitory computer-readable medium described herein may further include operations, features, means, or instructions for exchanging, via a backhaul interface, the signature value and the second signature value with the neighbor base station.

Some examples of the method, apparatuses, and non-transitory computer-readable medium described herein may further include operations, features, means, or instructions for coordinating with the neighbor base station to change the second PCI to a different value.

Some examples of the method, apparatuses, and non-transitory computer-readable medium described herein may further include operations, features, means, or instructions for transmitting a second control signal that indicates the second PCI and the second signature value associated with the neighbor cell.

In some examples of the method, apparatuses, and non-transitory computer-readable medium described herein, a system information transmission, a radio resource control (RRC) signal transmission, or a combination thereof.

In some examples of the method, apparatuses, and non-transitory computer-readable medium described herein, the PCI, a primary network operator identifier, a secondary network operator identifier, a supported network operator identifier, a subscriber group identifier, a channel identifier, a bandwidth, a sub-band, or a combination thereof.

Some examples of the method, apparatuses, and non-transitory computer-readable medium described herein may further include operations, features, means, or instructions for transmitting the control signal in at least one of: a broadcast transmission, a multi-cast transmission, a physical layer transmission, a reference signal transmission, a synchronization signal transmission, a system information transmission, or a combination thereof.

A method of wireless communications at a UE is described. The method may include receiving a control signal from a neighbor base station over a channel of a shared radio frequency spectrum band, the control signal indicating a PCI and a signature value unique to a cell associated with the neighbor base station, performing a channel measurement procedure on the channel between the UE and the neighbor base station, and transmitting a feedback report to a serving base station indicating a performance measurement result based on the channel measurement procedure, the feedback report further indicating the PCI and the signature value associated with the neighbor cell.

An apparatus for wireless communications at a UE is described. The apparatus may include a processor, memory in electronic communication with the processor, and instructions stored in the memory. The instructions may be executable by the processor to cause the apparatus to receive a control signal from a neighbor base station over a channel of a shared radio frequency spectrum band, the control signal indicating a PCI and a signature value unique to a cell associated with the neighbor base station, perform a channel measurement procedure on the channel between the UE and the neighbor base station, and transmit a feedback report to a serving base station indicating a performance measurement result based on the channel measurement procedure, the feedback report further indicating the PCI and the signature value associated with the neighbor cell.

Another apparatus for wireless communications at a UE is described. The apparatus may include means for receiving a control signal from a neighbor base station over a channel of a shared radio frequency spectrum band, the control signal indicating a PCI and a signature value unique to a cell associated with the neighbor base station, performing a channel measurement procedure on the channel between the UE and the neighbor base station, and transmitting a feedback report to a serving base station indicating a performance measurement result based on the channel measurement procedure, the feedback report further indicating the PCI and the signature value associated with the neighbor cell.

A non-transitory computer-readable medium storing code for wireless communications at a UE is described. The code may include instructions executable by a processor to receive a control signal from a neighbor base station over a channel of a shared radio frequency spectrum band, the control signal indicating a PCI and a signature value unique to a cell associated with the neighbor base station, perform a channel measurement procedure on the channel between the UE and the neighbor base station, and transmit a feedback report to a serving base station indicating a performance measurement result based on the channel measurement procedure, the feedback report further indicating the PCI and the signature value associated with the neighbor cell.

Some examples of the method, apparatuses, and non-transitory computer-readable medium described herein may further include operations, features, means, or instructions for determining, based on a result of the channel measurement procedure, that the channel between UE and the neighbor base station satisfies a performance threshold level and configuring the feedback report to indicate that the channel satisfies the performance threshold.

Some examples of the method, apparatuses, and non-transitory computer-readable medium described herein may further include operations, features, means, or instructions for receiving a second control signal from the serving base station indicating a second PCI and a second signature value unique to a second cell associated with the serving base station.

In some examples of the method, apparatuses, and non-transitory computer-readable medium described herein, the signature value unique to the neighbor cell may be based on a hash of a globally unique set of characteristics associated with the neighbor cell.

In some examples of the method, apparatuses, and non-transitory computer-readable medium described herein, the PCI, a primary network operator identifier, a secondary network operator identifier, a supported network operator identifier, a subscriber group identifier, a channel identifier, a bandwidth, a sub-band, or a combination thereof.

In some examples of the method, apparatuses, and non-transitory computer-readable medium described herein, a broadcast transmission, a multi-cast transmission, a physical layer transmission, a reference signal transmission, a synchronization signal transmission, a system information transmission, or a combination thereof.

DETAILED DESCRIPTION

Figure 1:
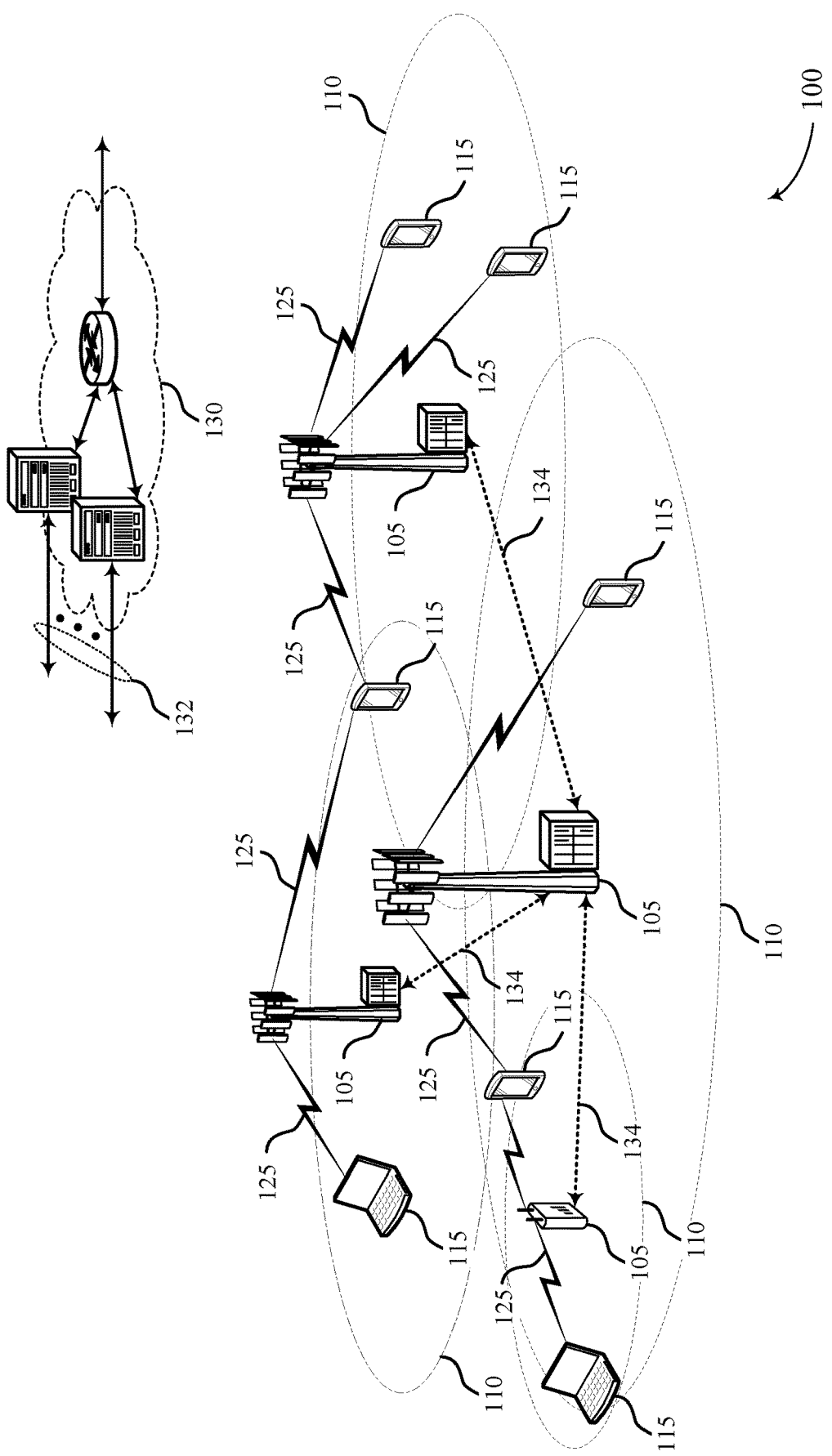
FIG. 1 illustrates an example of a system for wireless communications that supports identification of cells in new radio (NR) unlicensed in accordance with aspects of the present disclosure.

In some aspects, wireless networks may be deployed with minimal or no coordination. For example, a single network operator may deploy a wireless network, but without a central entity controlling the configuration of each base station within the network. As another example, multiple network operators (e.g., public land mobile network(s) (PLMN(s))) may deploy their own respective wireless networks, but without coordination amongst the different network operators. This may result in the situation where base stations operating the wireless network may be configured with the same (or substantially the same) identifier, such as a physical cell identity (PCI) for one or more cells belonging to the respective base stations. Thus, multiple cells within the wireless network may have the same PCI, which introduces confusion (e.g., PCI confusion/collision) amongst the wireless devices operating in the network. As one non-limiting example, user equipment (UEs) operating in the wireless network may monitor various channels to monitor/measure channel performance. A UE may perform channel measurements over a channel between the UE and respective base stations/cells, with the or more of the cells having the same PCI. Accordingly, the UE and its serving base station may be unable to differentiate between the cells having the same PCI.

Aspects of the disclosure are initially described in the context of a wireless communication system. In some aspects, wireless communication systems may be configured to support improved differentiation between cells belonging to base stations in a wireless network operating in a shared or unlicensed radio frequency spectrum band. Generally, aspects of the described techniques provide a mechanism that performs a hash function on the cell's globally unique set of characteristics to generate a signature value that is unique only to that cell. Broadly, the unique characteristics that may be input to the hash function may refer to any information configured for the cell. For example, the unique characteristics may include the PCI the cell, the network operator associated with the cell (or base station that the cell belongs to), the bandwidth of the cell, the channel the cell is using, and the like. Accordingly, the cell (or its associated base station) may identify the globally unique set of characteristics and generate the signature value for that cell using a hash of the globally unique set of characteristics. The base station/cell may transmit a control signal (e.g., a downlink control information (DCI)) that carries or otherwise conveys the indication of the signature value and, in some instances, the PCI of the cell.

UEs operating the wireless network may receive the control signal(s), perform channel measurement(s) of the channel between the UE and its serving base station/cell, and include the indication of the signature value of the cell in its feedback report to the serving base station/cell. Moreover, the UEs may receive control signals from neighboring base station(s)/cell(s), perform channel measurements of the channels between the UE and the neighboring base station(s)/cell(s), and include the indication of the signature value of the neighbor cell(s) in its feedback report to its serving base station. In some aspects, the neighboring base station(s)/cell(s) may also include the indication of the respective PCI, which may also be reported to the serving base station in the feedback report from the UE. Accordingly, each signature value may be unique to the respective cell, which provides an improved mechanism to differentiate between the cells belonging to base stations operating in the shared or unlicensed radio frequency spectrum band.

In the example where the PCI is included in the control signals, this may also provide a mechanism that allows for detection and/or mitigation of PCI confusion/collision within the wireless network. For example, the serving base station of the UE may receive multiple feedback reports and use the channel measurements being reported in the feedback report to determine when a handoff of the UE may be warranted. When the feedback report includes the indication of the PCI for the neighboring base station(s)/cell(s), this may also provide an indication to the serving base station of whether any of the cells belonging to base stations of the wireless network are using the same PCI. When detected, the serving base station may update or change its own PCI (e.g., such as when the PCI of the serving base station is the same as a PCI of a cell of a neighboring base station of the UE and/or when the serving base station is unable to coordinate directly with the neighboring base station to change the PCI of their cell(s)). Additionally or alternatively, the serving base station may coordinate with the neighboring base station (e.g., directly over the wireless network and/or via backhaul and/or through the UE providing the feedback report) in order for the neighboring base station to change the PCI of its cell(s). Moreover, the serving base station and neighboring base station(s) may exchange respective signature value(s) over a backhaul link and/or over a wireless link. Thus, the combination of the signature value that is unique to each cell in a wireless network and the PCI of the cell provides a low data payload mechanism to differentiate between cells and, when detected, resolve the situation where multiple cells use the same PCI.

Aspects of the disclosure are further illustrated by and described with reference to apparatus diagrams, system diagrams, and flowcharts that relate to identification of cells in NR unlicensed.

FIG. 1 illustrates an example of a wireless communications system 100 that supports identification of cells in NR unlicensed in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data.

In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling.

A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a base station 105 may identify a globally unique set of characteristics associated with a cell associated with the base station 105. The base station 105 may generate a signature value unique to the cell based at least in part on a hash of the globally unique set of characteristics associated with the cell. The base station 105 may transmit a control signal over a channel of a shared radio frequency spectrum band, the control signal comprising a physical cell identifier of the cell and the signature value.

In some aspects, a UE 115 may receive a control signal from a neighbor base station 105 over a channel of a shared radio frequency spectrum band, the control signal indicating a physical cell identifier and a signature value unique to a cell associated with the neighbor base station 105. The UE 115 may perform a channel measurement procedure on the channel between the UE 115 and the neighbor base station 105. The UE 115 may transmit a feedback report to a serving base station 105 indicating a performance measurement result based on the channel measurement procedure, the feedback report further indicating the physical cell identifier and the signature value associated with the neighbor cell.

Figure 2:
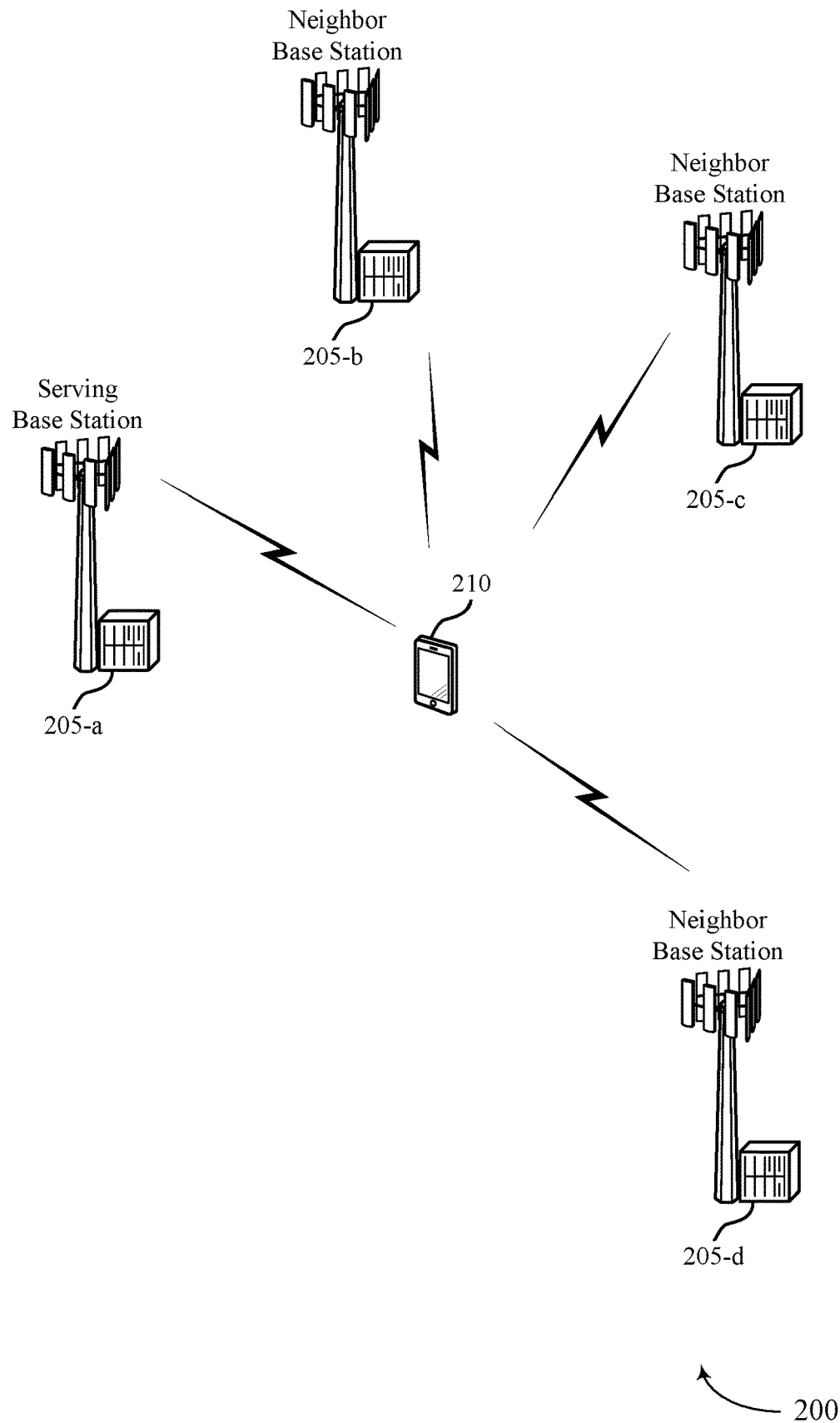
FIG. 2 illustrates an example of a wireless communication system that supports identification of cells in NR unlicensed in accordance with aspects of the present disclosure.

FIG. 2 illustrates an example of a wireless communications system 200 that supports identification of cells in NR unlicensed in accordance with aspects of the present disclosure. In some examples, wireless communications system 200 may implement aspects of wireless communications system 100. Wireless communications system 200 may include base stations 205 and a UE 210, which may be examples of the corresponding devices described herein. In some aspects, wireless communications system 200 may be a mmW network.

In some aspects, wireless communications system 200 may be deployed or otherwise operate in a shared or unlicensed radio frequency spectrum band. For example, each device operating within wireless communications system 200 may typically perform a listen-before-talk (LBT) procedure, clear channel assessment (CCA) procedure, and the like before accessing the wireless channel. In some aspects, deployment of wireless communications system 200 may be coordinated, partially correlated, or un-coordinated. For example, one or more of the base stations 205 may be associated with a first network operator (e.g., public land mobile network (PLMN)) whereas the other base stations 205 may be associated with a second network operator. Moreover, some of the base stations 205 may be associated with a different subscriber groups (e.g., closed subscriber group (CSG)). Broadly, references to a network operator (such as a network operator identifier (ID)) may include a PLMN ID or a combination of a PLMD ID and a second network operator identifier or a completely different identifier. In some aspects, wireless communications system 200 may include a private network and/or an IoT network.

When the base stations 205 are operating in a shared or unlicensed radio frequency spectrum band, different network operators or similar organizations may deploy base stations 205 without coordination among them (while access to the spectrum is subject to regulatory conditions and tests). Even within a single network operator, the deployment could be "ad-hoc" without a central entity controlling the configuration and operation of the base stations 205.

One of the issues with the above deployment is that the same identities (e.g., PCI) may be inadvertently used by different base stations 205 for their respective cells. For example, the PCI (which is physical cell identity of a cell belonging to the respective base station 205) may be used by UE 210 to differentiate cells (e.g., base stations 205) while performing channel measurements and performance feedback. The usage of the same PCI among different neighbor cells (e.g., different base stations 205) due to a lack of/or mis-coordination is a problem even for networks operating in a licensed radio frequency spectrum band. In some aspects, this problem may be referred to as PCI confusion and/or collision. However, in some cases, this may be for the same network operator since a licensed carrier is owned by a single network operator in a region. For this problem, the main solution when a base station 205 detects this problem is for the UE 210 to report a cell's full identity and the base station 205 to take corrective action (for example changing the PCI).

Even though the above solution can be used for unlicensed operation as well, it may not solve the issue completely due to the expected prevalence of the problem. That is, deployment in an unlicensed or shared radio frequency band may exacerbate the problem where multiple base stations 205 assign the same PCI to their respective cells.

For an RRC idle/inactive mode behavior of UE 210, a mechanism may be used where UE 210 may avoid camping on the best cell since this cell may not belong to the registered PLMN. Note that, for licensed operation, it may be assumed that the UE 210 can camp on the best cell. One solution is for the UE 210 to always read a system information block one (SIB1) and read the full cell identity of the respective base station 205. However, this approach is very costly for UE 210 in terms of power, data payload, and the like. It will also require measurement gaps in the connected mode UE 210, and thus will reduce throughput since the UE 210 will not receive packets during the gaps. An alternative option is to embed the full cell identity into the physical channel. This will allow the UE 210 to identify a cell correctly while performing measurements. The issue with using the full cell identity at the physical layer is that this information is quite large, e.g., includes a large amount of information associated with the respective base station 205 and their configured cell(s). However, aspects of the described techniques provide a mechanism that allows for distinguishing between different cells belonging to base stations 205 using a signature value that is unique to each and every cell.

Generally, UE 210 may be associated with serving base station 205-a. For example, UE 210 may be camped on serving base station 205-a and serving base station 205-a may monitor, control, and/or manage one or more aspects of wireless communications between UE 210 and serving base station 205-a. However, UE 210 may also be located close enough to one or more neighboring base stations 205 to allow UE 210 to monitor and report the channel performance for channels between the UE 210 and the neighboring base stations 205 (e.g., their associated cells). However, as discussed above, some of the neighboring base stations may be associated with different network operators (e.g., different PLMN), with different subscriber groups, and the like. Accordingly, one or more cells of the base stations 205 may be configured with same identifier (e.g., PCI), which would otherwise create confusion at UE 210, such as when UE 210 performs channel measurements, during a handover procedure, and the like.

To address this, aspects of the described techniques provide a mechanism where each base station 205 (and/or its respective cell) transmits a signature value that is unique to the cell(s) belonging to the base station 205. For example, each base station 205 may identify or otherwise determine a globally unique set of characteristics that are associated with the cell belonging to, or otherwise associated with, the base station 205. Broadly, the set of characteristics may include any information, configuration, parameter, operating condition, and the like, associated with the respective cell belonging to the base station 205. Examples of such characteristics include, but are not limited to, the PCI the cell, the full cell identity of the cell, a network operator associated with base station 205 (e.g., the currently configured network operator, a primary/secondary network operator, a supported network operator, and the like), and the like. Additional examples of the characteristics include, but are not limited to, the bandwidth or bandwidth part (BWP) of the base station 205 (or respective cell), the channel or subcarrier of the base station 205 (or respective cell), and the like. Other characteristics of the cell may also be utilized.

Generally, each of the base stations 205 (or their respective cells) may generate a signature value that is unique to the cell based at least in part on the set of globally unique characteristics. For example, each of the base stations 205 may use a hash function that includes one or more of the globally unique set of characteristics as inputs to the hash function, with the signature value as the output of the hash function. The hash function may be unique to each base station 205 and/or shared between base stations 205. Generally, the hash function may, based on the unique set of characteristics input to the hash function, provide an output (e.g., the signature value) that is unique to each respective cell belonging to the base station 205.

As one example, each base station 205 may individually select which inputs and/or have the inputs selected by a network function. Moreover, the selected inputs to the hash function may be randomly selected and/or may change over time. In the situation where each base station 205 utilizes the same inputs to the hash function, differences in network operators, subscriber group, bandwidth, communication mode, and the like, may result in a unique signature value for the cell.

Generally, each base station 205 (or respective cell) may transmit a control signal over the shared or unlicensed radio frequency spectrum band that carries or otherwise conveys an indication of the signature value of the cell and, in some examples, the PCI of the cell. Generally, the control signal may refer to any physical layer signal. In some aspects, the control signal may include, but is not limited to, a broadcast transmission, a multicast transmission, and/or a unicast transmission. In some aspects, the control signal may refer to a reference signal transmission (e.g., such as a channel state information reference signal (CSI-RS), a tracking reference signal, a beam management reference signal, and the like). In some aspects, the control signal may refer to a synchronization signal transmission (e.g., such as a system information block (SIB), a master information block (MIB), a timing synchronization signal, a frequency alignment synchronization signal, and the like). In some aspects, the control signal may refer to any combination of the above described signals.

In some aspects, each control signal transmitted by a base station 205 (or its respective cell) may carry or otherwise convey an indication of the signature value that is unique to the cell of that base station 205. In some examples, the control signal may additionally carry or otherwise convey an indication of an identifier associated with that cell, e.g., such as the PCI of that cell. In some aspects, each base station 205 may exchange their respective signature value(s) for their respective cells with neighboring base stations 205 (e.g., over a SIB, RRC, and the like).

In some aspects, UE 210 may perform one or more channel measurements based on the control signals and report the results of the channel measurements to its serving base station 205-a. For example, serving base station 205-a may transmit a control signal over the channel of the shared or unlicensed radio frequency spectrum band to UE 210. UE 210 may receive the control signal and recover the signature value of the cell of serving base station 205-a and, when included, the PCI of the cell. UE 210 may perform a channel measurement procedure on the channel between the UE 210 and serving base station 205-a (or cell). UE 210 may transmit the feedback report to serving base station 205-a that carries or otherwise conveys an indication of the performance measurement result of the channel measurement procedure. For example, the feedback report may report or otherwise indicate one or more performance metrics of the channel, e.g., such as a CQI of the channel. In some aspects, the feedback report may also carry or otherwise convey an indication of the signature value of the cell of the serving base station 205-*a* and, when included, the PCI of the cell of serving base station 205-*a*.

In some aspects, UE 210 may be located or otherwise positioned such that UE 210 can also perform channel measurements and reporting for one or more neighboring base stations 205 (e.g., one or more cells of neighboring base stations 205-*b*, 205-*c*, and/or 205-*d*). By way of example only, UE 210 may receive a control signal from neighboring base station 205-*c* that carries or otherwise conveys an indication of the signature value that is unique to the cell of neighboring base station 205-*c* and, when included, the PCI of the cell. That is, neighboring base station 205-*c* may also generate its signature value based on a globally unique set of characteristics of the cell of neighboring base station 205-*c*. UE 210 may perform a channel measurement procedure on the channel between UE 210 and the neighboring base station 205-*c* and transmit a feedback report to its serving base station 205-*a* that indicates the performance measurement result of the channel measurement procedure. The feedback report may carry or otherwise convey an indication of the signature value of the cell of neighboring base station 205-*c* and, when included, the PCI of the cell. UE 210 may perform similar procedures with one or more of the other neighboring base stations 205-*b* and/or 205-*d*.

In some aspects, UE 210 may utilize one or more of the channel measurement procedures to support handover operations. For example, UE 210 may determine that, based on the results of the channel measurement procedure, that the channel between UE 210 and neighboring base station 205-*c* satisfies a performance threshold level. Examples of the channel performance result may include, but are not limited to, a receive power level of the control signal, an interference level, a throughput level, and the like. Another example of the channel performance result may include, but is not limited to, a determination that the channel between UE 210 and the neighboring base station 205-*c* (or its respective cell) supports a wider bandwidth than the channel between UE 210 and its serving base station 205-*a*. In response, UE 210 may configure the feedback report to carry or otherwise convey an indication that the channel between UE 210 and the cell of neighboring base station 205-*c* satisfies the performance threshold level. Serving base station 205-*a* may receive this feedback report and initiate a handover of UE 210 to neighboring base station 205-*c* based on the channel between UE 210 and neighboring base station 205-*c* satisfying performance threshold level.

In some aspects, base stations 205 may provide an indication to UEs located within the coverage area of the signature values and PCI of cells of neighboring base stations 205. For example, serving base station 205-*a* may receive a feedback report from UE 210 that indicates the signature values and PCIs for neighboring base stations 205-*b*, 205-*c*, and/or 205-*d*. In response, serving base station 205-*a* may transmit a signal (such as a second control signal) to UEs operating within its coverage area (such as UE 210) that carries or otherwise conveys the indication of the respective signature values and/or PCI for each of the cells of neighboring base stations 205. In some aspects, the serving base station 205-*a* may convey the indication in a higher layer signaling (e.g., the second control signal), such as an RRC signal, a MAC CE, and the like. Moreover, the base stations 205 may exchange their respective signature values via a backhaul interface and/or using one or more signals over the wireless network.

In some aspects, base stations 205 may utilize the feedback reports provided by UEs within its coverage area (such as UE 210) to detect and/or mitigate PCI confusion/collision. For example, serving base station 205-*a* may receive a set of feedback reports from UE 210 based on a channel measurement procedure performed between UE 210 and neighboring base station 205-*c*. As discussed, the feedback report may carry or otherwise convey the indication of the signature value and/or PCI of the cell of neighboring base station 205-*c*. Serving base station 205-*a* may determine that the PCI of a cell of neighboring base station 205-*c* is the same as the PCI of serving base station 205-*a* and/or one or more of the cells of other neighboring base stations 205 (e.g., such as neighboring base stations 205-*b* and/or 205-*d*). In response, serving base station 205-*a* may update or change its PCI to a different value (e.g., from a first value to a second value). Alternatively, serving base station 205-*a* may coordinate with neighboring base station 205-*c* to change the PCI of the cell of neighboring base station 205-*c* to a different value (e.g., from a first value to a second value). Such coordination may occur over the wireless channel between serving base station 205-*a* and neighboring base station 205-*c* and/or over a backhaul link, e.g., such as an X2 interface.

Thus, aspects of the described techniques define a hash function from a cell's (e.g., base station 205) (global) characteristics to a signature value. Transmitting the signature value may be performed at the physical layer, for example in a new physical channel or by embedding in the existing signal. The hash function can be specified, such as by a standards body, e.g., by 3GPP, or left to implementation. The cell characteristics may be the supported PLMNs along with the cell identities (e.g., PCI). The cell characteristics may include the primary PLMN and a corresponding cell identity. The cell characteristics may include a different network operator or entity identity (ID), e.g., for private networks, it could be a PLMN ID plus another ID or a completely different ID. Broadcasting (by any of the base stations 205) the signature values of neighbor cells (or neighboring base stations 205) may help UE 210 in finding the correct cell for reselection or for handover targets. Transmitting the signature values of neighbor cells to UE 210 may be performed by dedicated signaling (e.g., RRC).

In some aspects, UE 210 may read a SIB1 signal during initial access (e.g., during an attach procedure) and when it does not know the signature value of the prospective serving base station 205 and/or neighboring base stations 205. UE 210 reporting the signature values of neighbor cells may be implemented, for example as part of CQI reporting. The signature values may be used in the measurement configuration (as a replacement for, or in addition to, PCI). The signature value can also be based on the frequency and/or sub-band used by the base station 205. Exchanging the cell signature value information may be coordinated between base stations 205, e.g., over a backhaul link, such as an Xn interface. The signature value can further be based on whether a cell (e.g., base station 205) belongs to a CSG.

Figure 3:
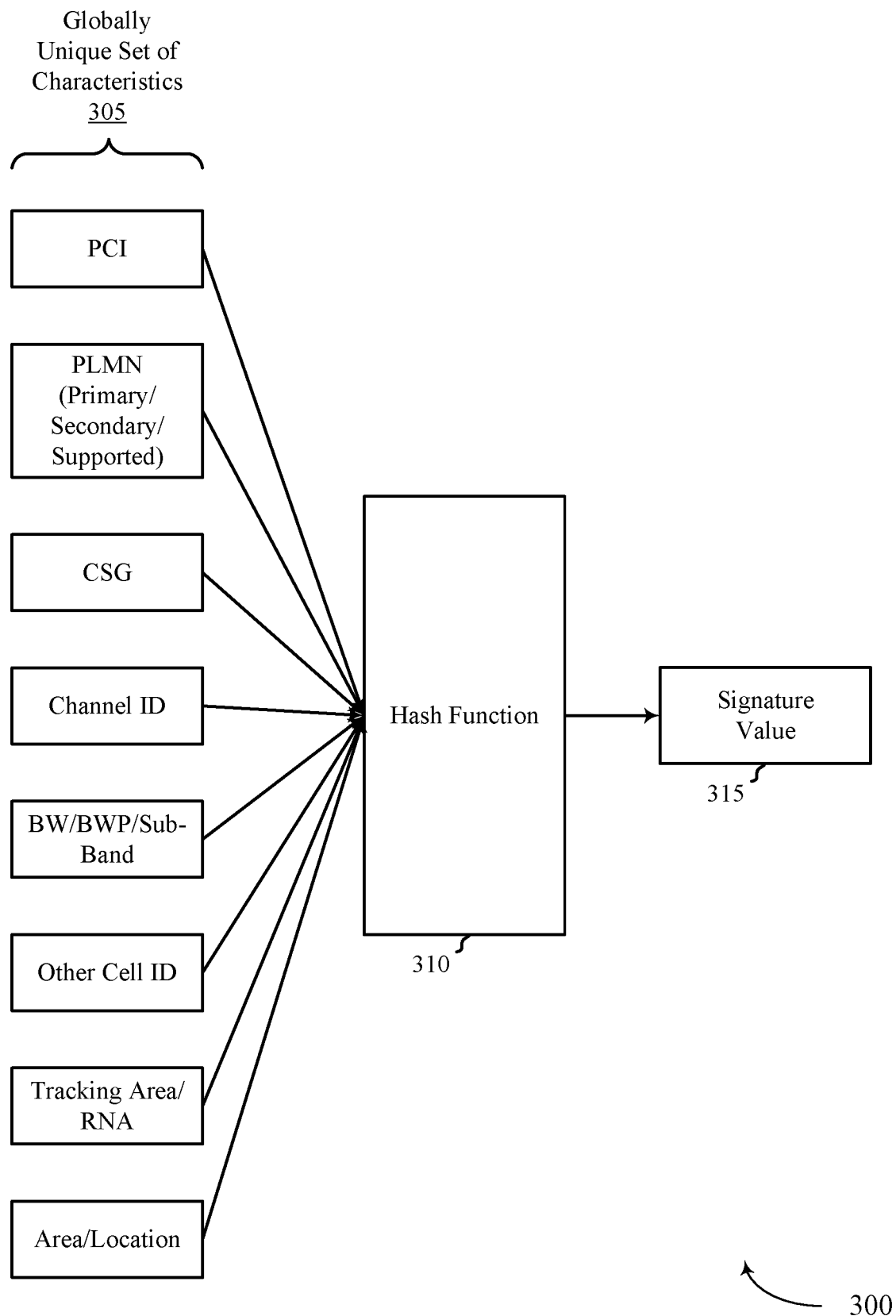
FIG. 3 illustrates an example of a hash function that supports identification of cells in NR unlicensed in accordance with aspects of the present disclosure.

FIG. 3 illustrates an example of a hash function 300 that supports identification of cells in NR unlicensed in accordance with aspects of the present disclosure. In some examples, hash function 300 may implement aspects of wireless communications systems 100 and/or 200. Aspects of hashing configuration 300 may be implemented by a base station and/or a UE, which may be examples of the corresponding devices described herein.

Generally, hashing configuration 300 illustrates one example of how the base station operating in a shared or unlicensed radio frequency spectrum band may generate a signature value 315 for each of its cells by performing a hash function 310 using a globally unique set of characteristics 305 of the respective cell. Generally, the globally unique set of characteristics 305 may include any information, parameter, configuration, association, and the like, of the cell. Examples include, but are not limited to, a PCI of the cell, a network operator (e.g., PLMN) associated with the base station/cell (e.g., the currently configured PLMN, a primary and/or secondary PLMN, and/or an indication of any supported PLMNs), a subscriber group (e.g., CSG), a channel identifier, a bandwidth/BWP/sub-band associated with a base station/cell, any other identifier associated with the base station/cell, a tracking area or radio access network-based notification area (RNA) of the base station/cell, and the like. It is to be understood that the listed globally unique set of characteristics 305 is not an exhaustive list and other information may be input.

Generally, the base station (or its respective cell) may autonomously select, update, and/or change which of the globally unique set of characteristics 305 that are being input into the hash function 310. Additionally and/or alternatively, a network entity (such as a core network function, a network operator central coordination function, and the like) may dictate or otherwise provide information concerning which inputs are provided to the hash function 310.

Generally, the hash function 310 may accept the inputs from the globally unique set of characteristics 305 and perform a hash operation to generate a signature value 315 that is unique to that cell. Although the present discussion generally refers to a hash function 310 being utilized, it is to be understood that any function that accepts inputs from the globally unique set of characteristics 305 and provides an output that is unique to the cell of the base station may be utilized in accordance with aspects of the described techniques. The hash function 310 may refer to any function that can map arbitrary data (e.g., the globally unique set of characteristics 305) to the signature value 315. As each base station/cell may have a different PLMN, a different bandwidth, different PCI, a different channel ID, and the like, each signature value 315 is unique to that cell, which provides an improved mechanism to differentiate between the cells of base stations and mitigate the situation where two cells of base stations utilize the same PCI. As one nonlimiting example, the base stations associated with the same network operator may typically be configured with different PCIs, whereas two cells of base stations associated with different network operators could more likely be configured with the same PCI. Accordingly, the hash function 310 provides a simple, low data overhead mechanism that allows UEs performing channel measurements on those cells of those base stations to detect when the same PCI is used.

In some aspects, each of the base stations (or their respective cells) operating in the wireless network over a shared or unlicensed radio frequency spectrum band may transmit control signals over the channel that carry or otherwise convey the indication of the signature value of the cell(s) of that base station and, in some examples, the PCI of the cell(s). UEs operating within the coverage area of multiple base stations may perform channel measurement procedures on the channels between the UE and its serving base station/cell and/or one or more neighboring base stations/cells. The UEs may transmit feedback reports to the serving base station that carries or otherwise conveys the indication of the performance measurement result based on a channel measurement procedure. The feedback report may additionally carry or otherwise convey, for each respective cell that the UE has performed the channel measurement procedure on, an indication of the signature value 315 of the cell and, in some examples, the PCI for the cell. This may support the serving base station coordinating with neighboring base stations when the same PCIs are used by a cell of the serving base station and a cell of the neighboring base station and/or between cells of multiple neighboring base stations. Moreover, this may support the serving base station providing a handover of the UE to a neighboring base stations, e.g., may improve identification and differentiation of the cells of the neighboring base station using the signature value of that cell.

Figure 4:
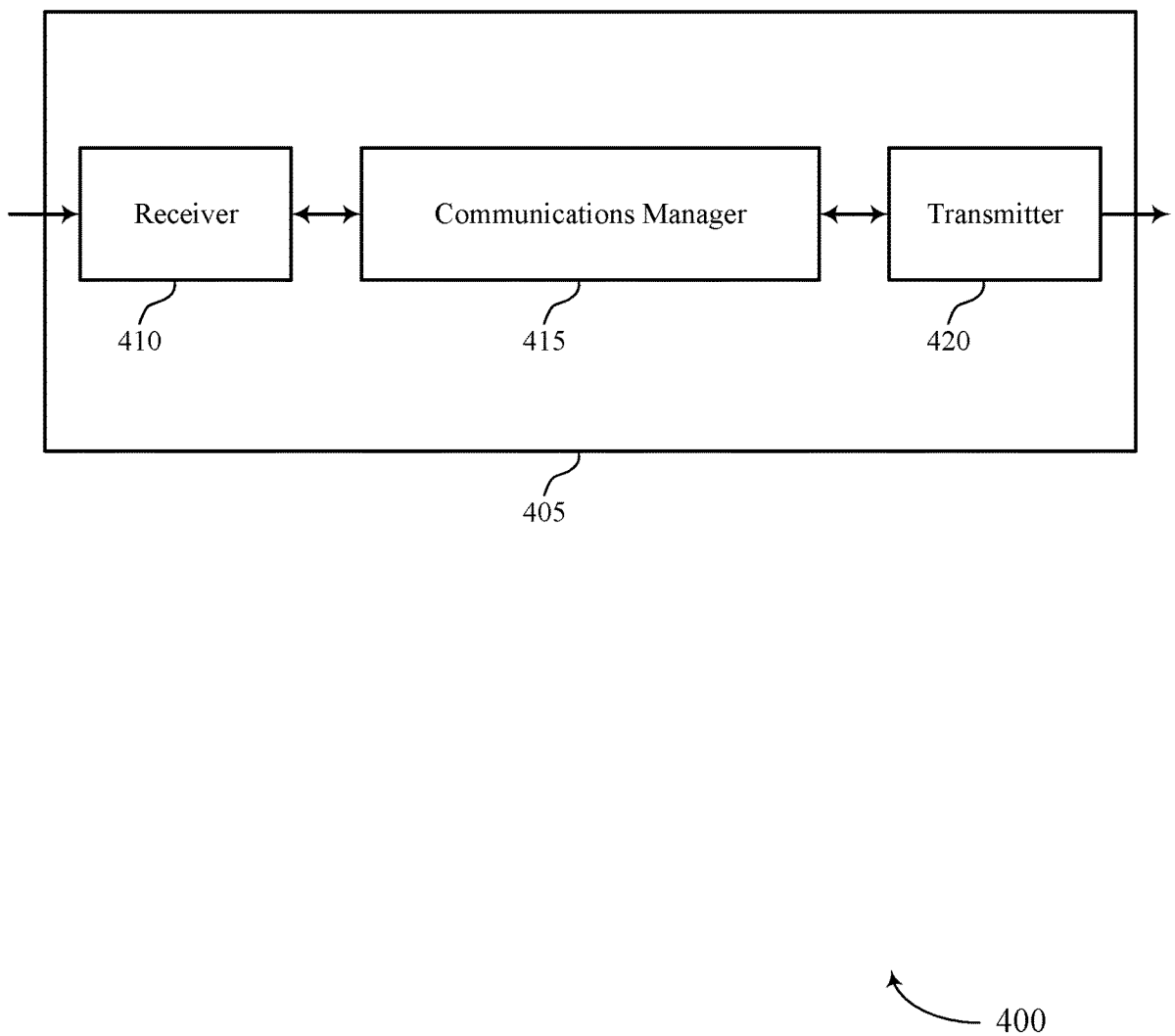
FIGS. 4 and 5 show block diagrams of devices that support identification of cells in NR unlicensed in accordance with aspects of the present disclosure.

FIG. 4 shows a block diagram 400 of a device 405 that supports identification of cells in NR unlicensed in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to identification of cells in NR unlicensed, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive a control signal from a neighbor base station over a channel of a shared radio frequency spectrum band, the control signal indicating a physical cell identifier and a signature value unique to a cell associated with the neighbor base station, perform a channel measurement procedure on the channel between the UE and the neighbor base station, and transmit a feedback report to a serving base station indicating a performance measurement result based on the channel measurement procedure, the feedback report further indicating the physical cell identifier and the signature value associated with the neighbor cell. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
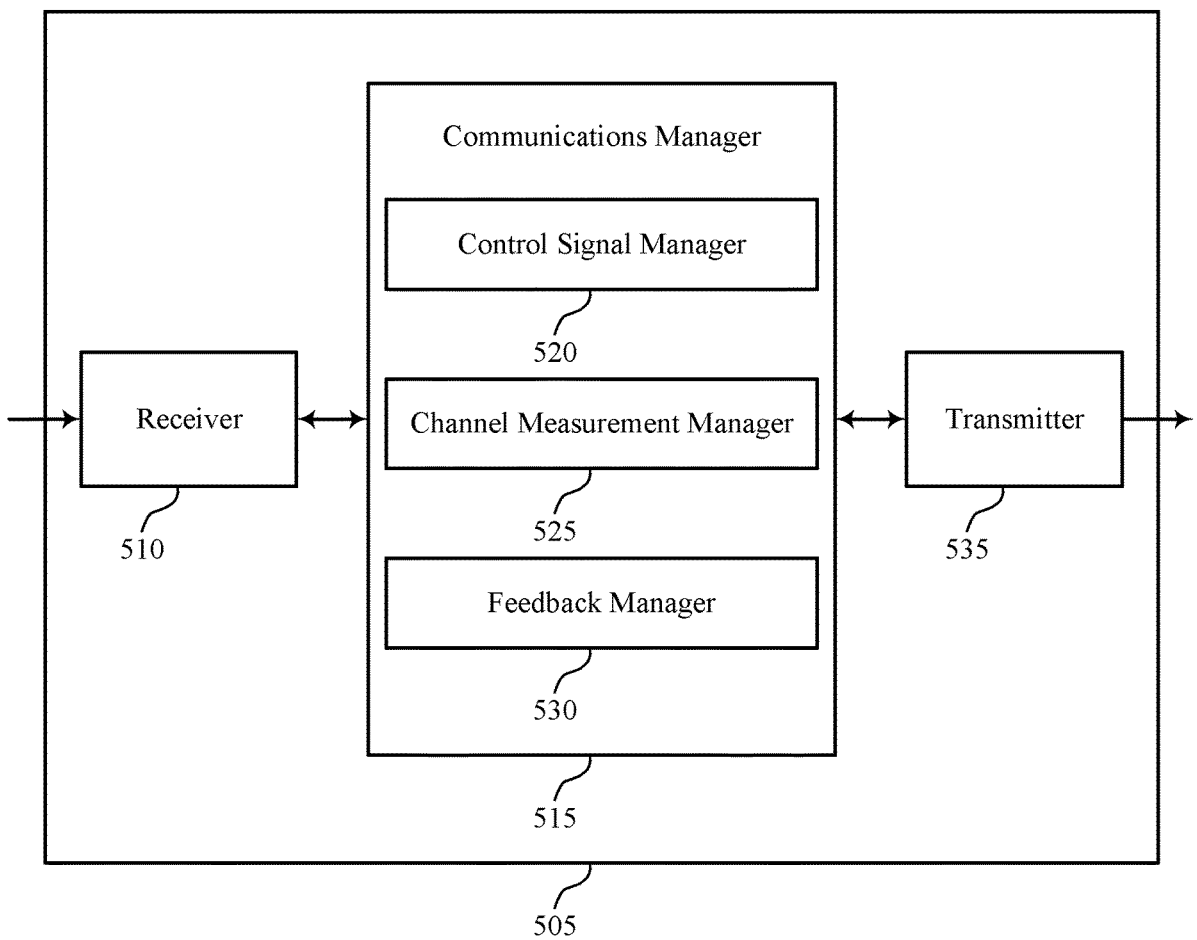

FIG. 5 shows a block diagram 500 of a device 505 that supports identification of cells in NR unlicensed in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to identification of cells in NR unlicensed, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a control signal manager 520, a channel measurement manager 525, and a feedback manager 530. The communications manager 515 may be an example of aspects of the communications manager 710 described herein.

The control signal manager 520 may receive a control signal from a neighbor base station over a channel of a shared radio frequency spectrum band, the control signal indicating a physical cell identifier and a signature value unique to a cell associated with the neighbor base station.

The channel measurement manager 525 may perform a channel measurement procedure on the channel between the UE and the neighbor base station.

The feedback manager 530 may transmit a feedback report to a serving base station indicating a performance measurement result based on the channel measurement procedure, the feedback report further indicating the physical cell identifier and the signature value associated with the neighbor cell.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
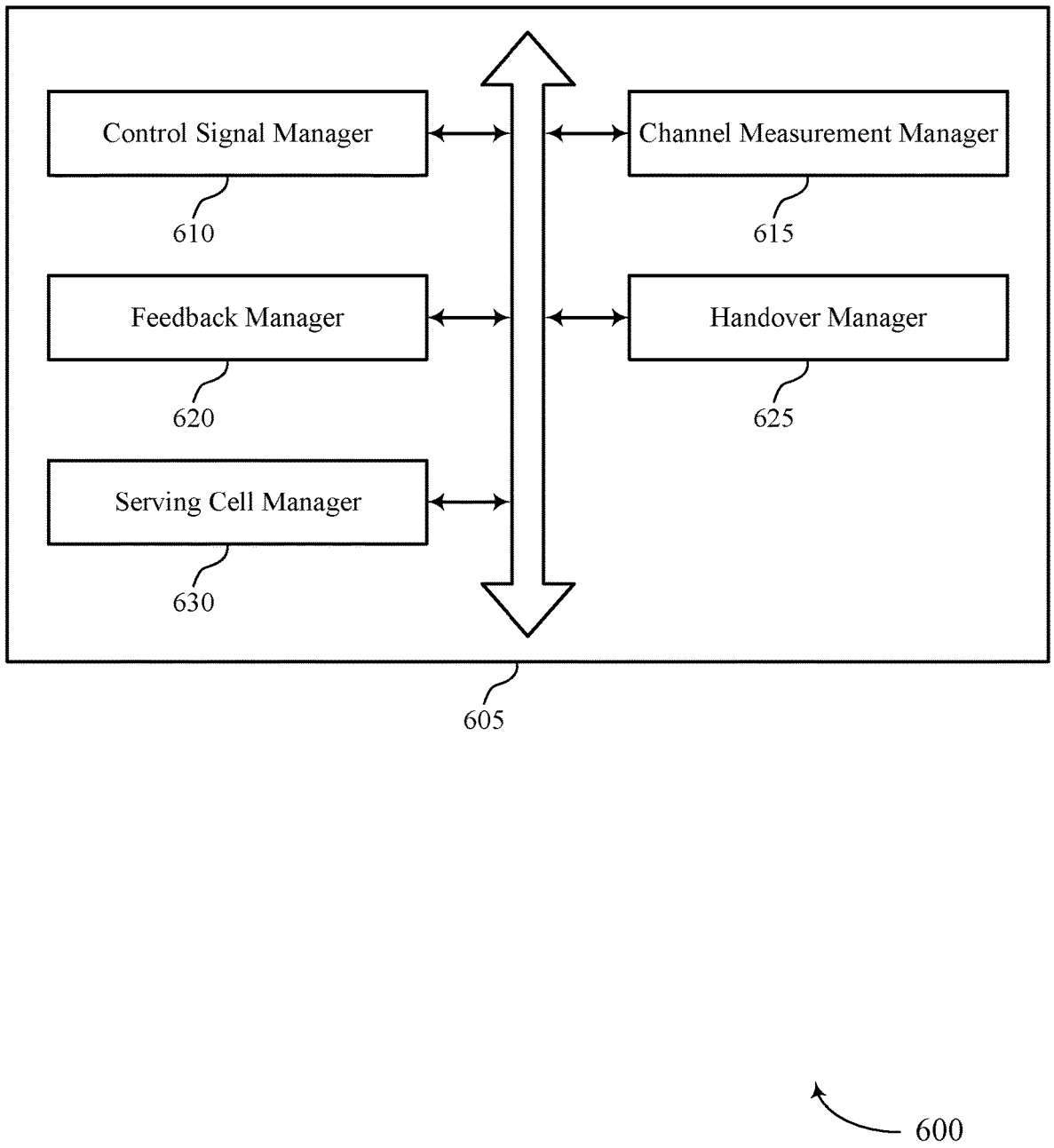
FIG. 6 shows a block diagram of a communications manager that supports identification of cells in NR unlicensed in accordance with aspects of the present disclosure.

FIG. 6 shows a block diagram 600 of a communications manager 605 that supports identification of cells in NR unlicensed in accordance with aspects of the present disclosure. The communications manager 605 may be an example of aspects of a communications manager 415, a communications manager 515, or a communications manager 710 described herein. The communications manager 605 may include a control signal manager 610, a channel measurement manager 615, a feedback manager 620, a handover manager 625, and a serving cell manager 630. Each of these modules may communicate, directly or indirectly, with one another (e.g., via one or more buses).

The control signal manager 610 may receive a control signal from a neighbor base station over a channel of a shared radio frequency spectrum band, the control signal indicating a physical cell identifier and a signature value unique to a cell associated with the neighbor base station. In some cases, the signature value unique to the neighbor cell is based on a hash of a globally unique set of characteristics associated with the neighbor cell. In some cases, the physical cell identifier, a primary network operator identifier, a secondary network operator identifier, a supported network operator identifier, a subscriber group identifier, a channel identifier, a bandwidth, a sub-band, or a combination thereof. In some cases, a broadcast transmission, a multi-cast transmission, a physical layer transmission, a reference signal transmission, a synchronization signal transmission, a system information block broadcast, or a combination thereof.

The channel measurement manager 615 may perform a channel measurement procedure on the channel between the UE and the neighbor base station.

The feedback manager 620 may transmit a feedback report to a serving base station indicating a performance measurement result based on the channel measurement procedure, the feedback report further indicating the physical cell identifier and the signature value associated with the neighbor cell.

The handover manager 625 may determine, based on a result of the channel measurement procedure, that the channel between UE and the neighbor base station satisfies a performance threshold level. In some examples, the handover manager 625 may configure the feedback report to indicate that the channel satisfies the performance threshold.

The serving cell manager 630 may receive a second control signal from the serving base station indicating a second physical cell identifier and a second signature value unique to a second cell associated with the serving base station.

Figure 7:
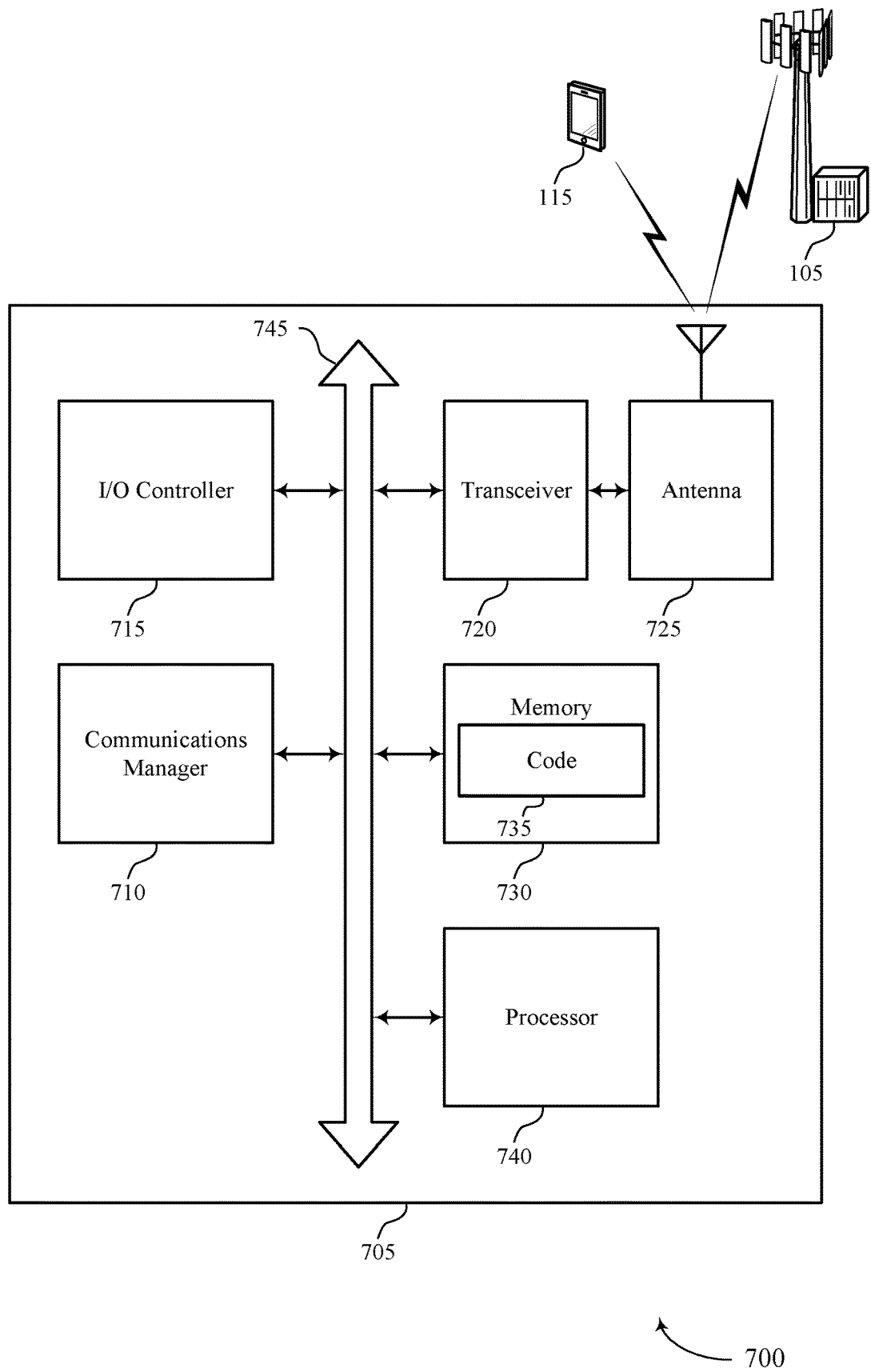
FIG. 7 shows a diagram of a system including a device that supports identification of cells in NR unlicensed in accordance with aspects of the present disclosure.

FIG. 7 shows a diagram of a system 700 including a device 705 that supports identification of cells in NR unlicensed in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive a control signal from a neighbor base station over a channel of a shared radio frequency spectrum band, the control signal indicating a physical cell identifier and a signature value unique to a cell associated with the neighbor base station, perform a channel measurement procedure on the channel between the UE and the neighbor base station, and transmit a feedback report to a serving base station indicating a performance measurement result based on the channel measurement procedure, the feedback report further indicating the physical cell identifier and the signature value associated with the neighbor cell.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting identification of cells in NR unlicensed).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
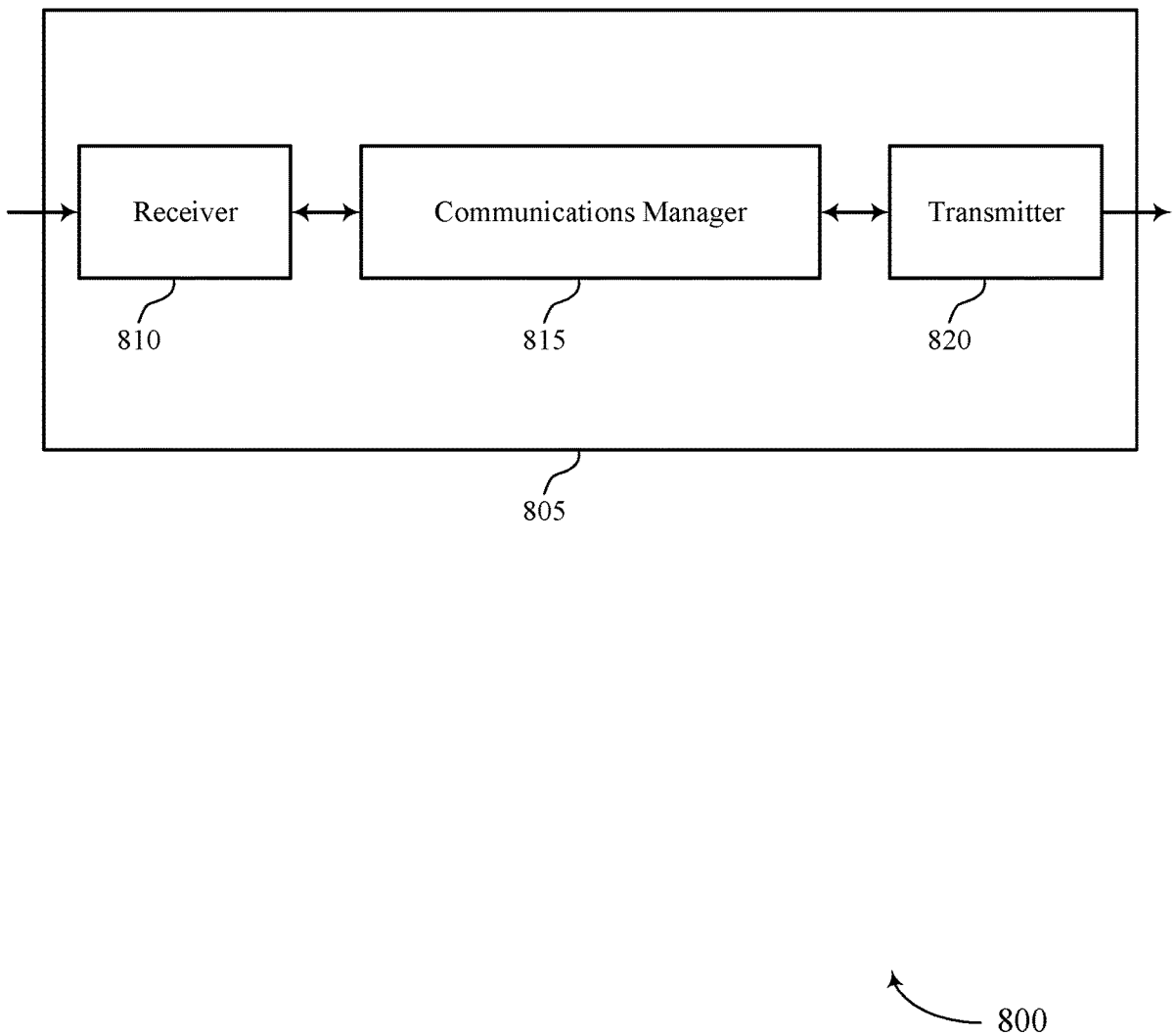
FIGS. 8 and 9 show block diagrams of devices that support identification of cells in NR unlicensed in accordance with aspects of the present disclosure.

FIG. 8 shows a block diagram 800 of a device 805 that supports identification of cells in NR unlicensed in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to identification of cells in NR unlicensed, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a globally unique set of characteristics associated with a cell associated with the base station, generate a signature value unique to the cell based on a hash of the globally unique set of characteristics associated with the cell, and transmit a control signal over a channel of a shared radio frequency spectrum band, the control signal including a physical cell identifier of the cell and the signature value. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
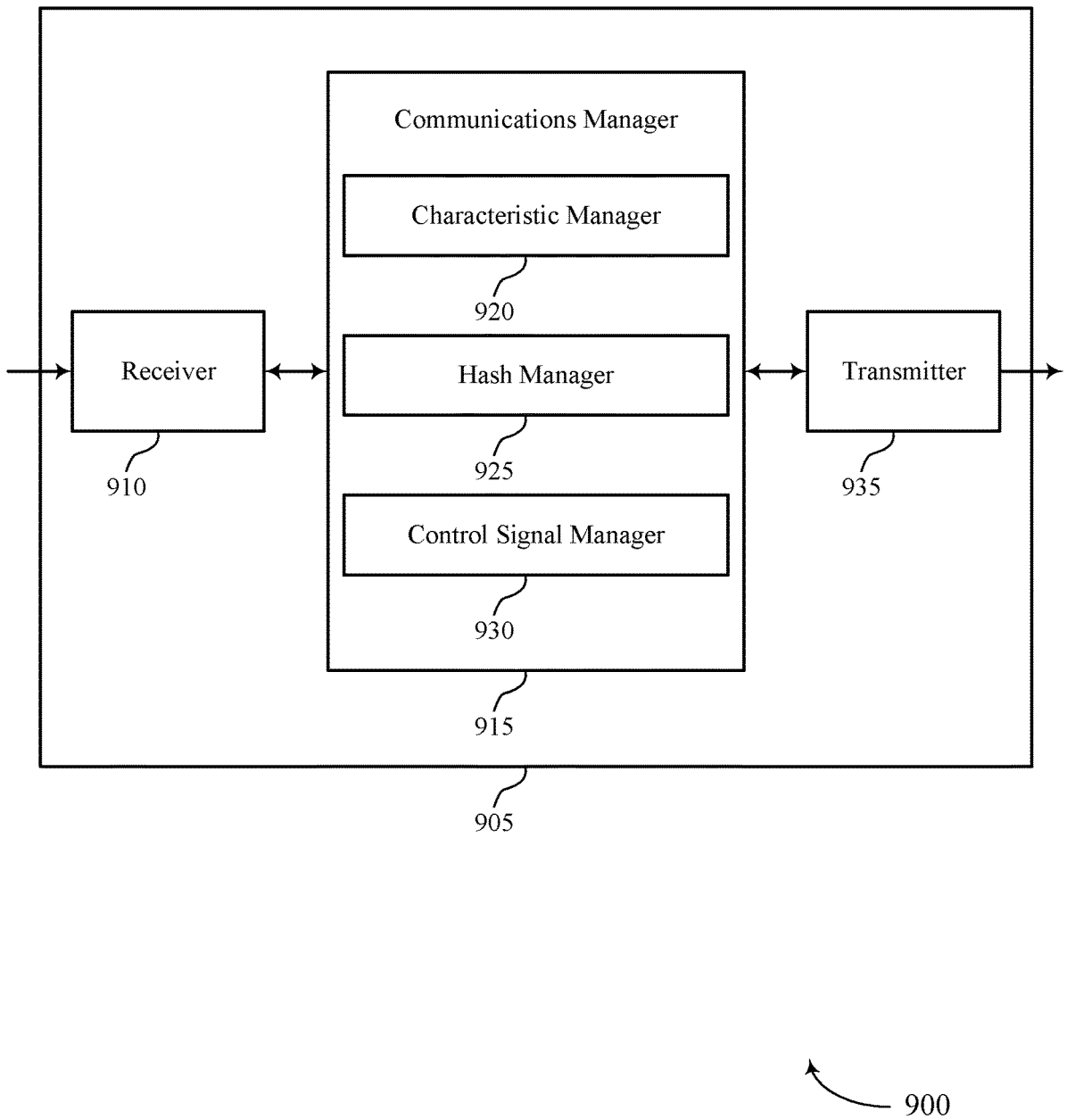

FIG. 9 shows a block diagram 900 of a device 905 that supports identification of cells in NR unlicensed in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to identification of cells in NR unlicensed, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a characteristic manager 920, a hash manager 925, and a control signal manager 930. The communications manager 915 may be an example of aspects of the communications manager 1110 described herein.

The characteristic manager 920 may identify a globally unique set of characteristics associated with a cell associated with the base station.

The hash manager 925 may generate a signature value unique to the cell based on a hash of the globally unique set of characteristics associated with the cell.

The control signal manager 930 may transmit a control signal over a channel of a shared radio frequency spectrum band, the control signal including a physical cell identifier of the cell and the signature value.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
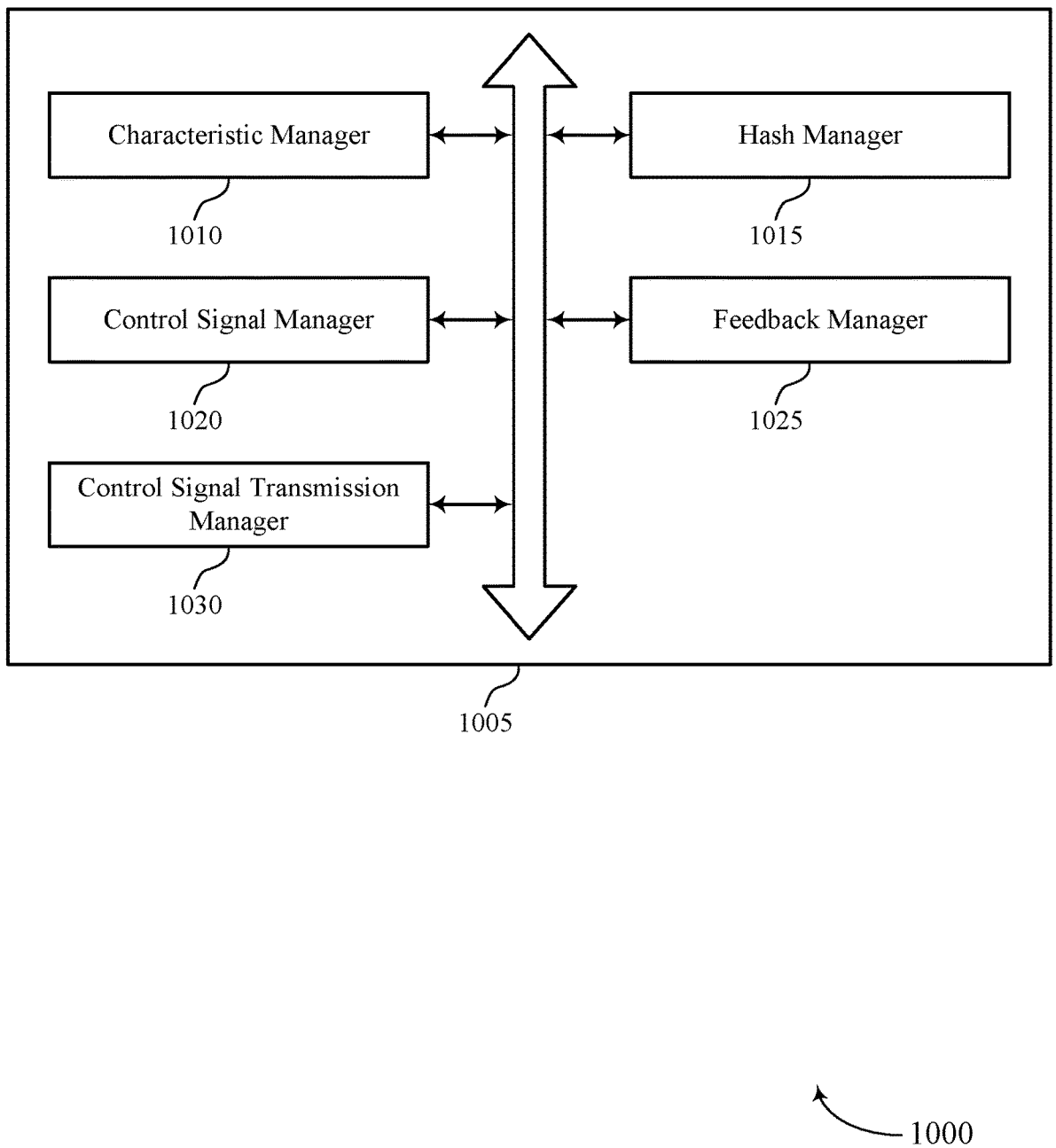
FIG. 10 shows a block diagram of a communications manager that supports identification of cells in NR unlicensed in accordance with aspects of the present disclosure.

FIG. 10 shows a block diagram 1000 of a communications manager 1005 that supports identification of cells in NR unlicensed in accordance with aspects of the present disclosure. The communications manager 1005 may be an example of aspects of a communications manager 815, a communications manager 915, or a communications manager 1110 described herein. The communications manager 1005 may include a characteristic manager 1010, a hash manager 1015, a control signal manager 1020, a feedback manager 1025, and a control signal transmission manager 1030. Each of these modules may communicate, directly or indirectly, with one another (e.g., via one or more buses).

The characteristic manager 1010 may identify a globally unique set of characteristics associated with a cell associated with the base station. In some cases, the physical cell identifier, a primary network operator identifier, a secondary network operator identifier, a supported network operator identifier, a subscriber group identifier, a channel identifier, a bandwidth, a sub-band, or a combination thereof.

The hash manager 1015 may generate a signature value unique to the cell based on a hash of the globally unique set of characteristics associated with the cell.

The control signal manager 1020 may transmit a control signal over a channel of a shared radio frequency spectrum band, the control signal including a physical cell identifier of the cell and the signature value.

The feedback manager 1025 may receive a feedback report from a UE indicating a performance measurement result for a channel between the UE and a neighbor cell associated with a neighbor base station, the feedback report further indicating a second physical cell identifier and a second signature value associated with the neighbor cell.

In some examples, the feedback manager 1025 may change, based on the second physical cell identifier, the second signature value, or a combination thereof, the physical cell identifier associated with the cell to a different value. In some examples, the feedback manager 1025 may exchange, via a backhaul interface, the signature value and the second signature value with the neighbor base station. In some examples, the feedback manager 1025 may coordinate with the neighbor base station to change the second physical cell identifier to a different value. In some examples, the feedback manager 1025 may transmit a second control signal that indicates the second physical cell identifier and the second signature value associated with the neighbor cell.

In some cases, a system information block broadcast, a radio resource control signal transmission, or a combination thereof.

The control signal transmission manager 1030 may transmit the control signal in at least one of: a broadcast transmission, a multi-cast transmission, a physical layer transmission, a reference signal transmission, a synchronization signal transmission, a system information block broadcast, or a combination thereof.

Figure 11:
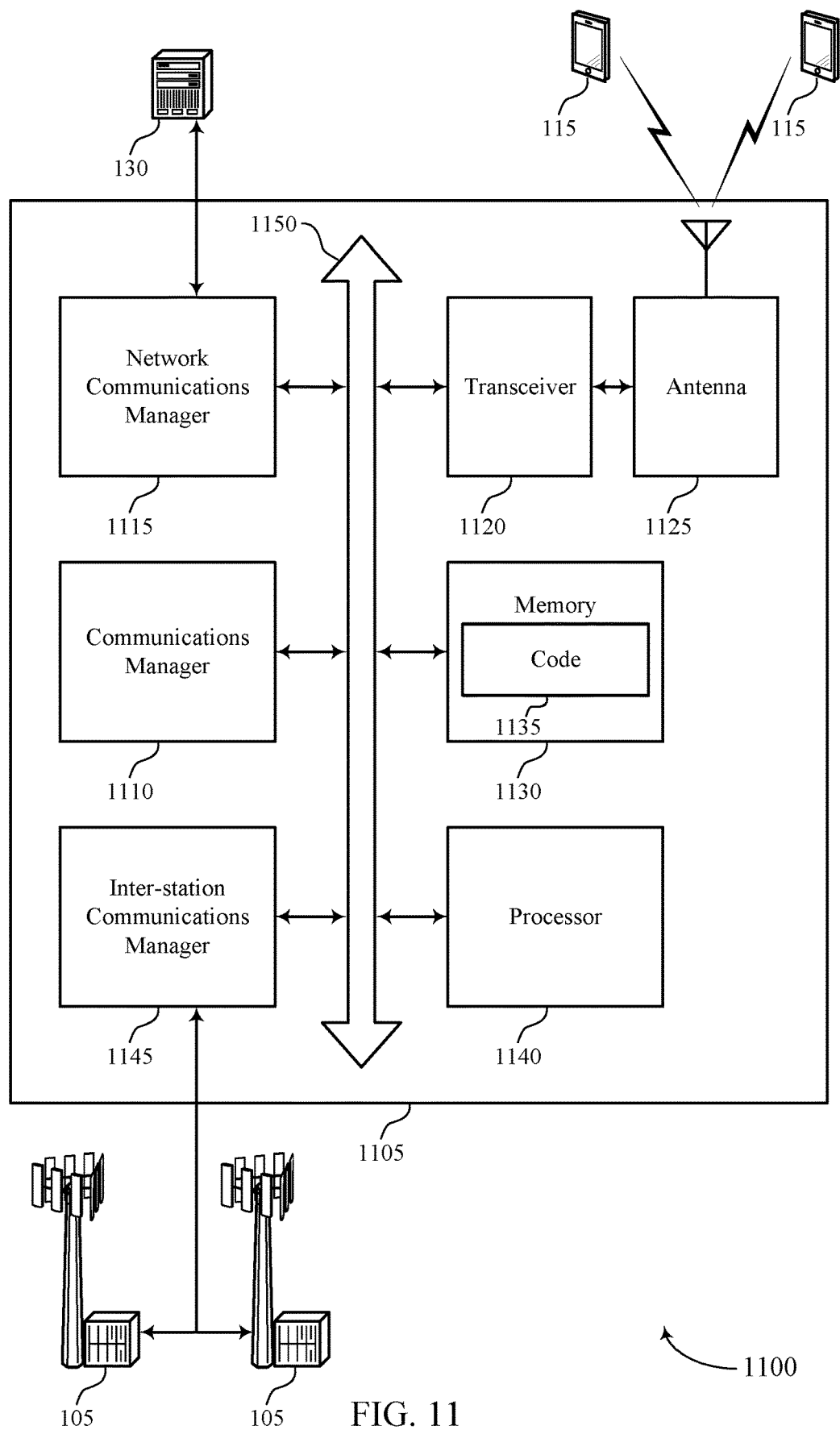
FIG. 11 shows a diagram of a system including a device that supports identification of cells in NR unlicensed in accordance with aspects of the present disclosure.

FIG. 11 shows a diagram of a system 1100 including a device 1105 that supports identification of cells in NR unlicensed in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify a globally unique set of characteristics associated with a cell associated with the base station, generate a signature value unique to the cell based on a hash of the globally unique set of characteristics associated with the cell, and transmit a control signal over a channel of a shared radio frequency spectrum band, the control signal including a physical cell identifier of the cell and the signature value.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting identification of cells in NR unlicensed).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
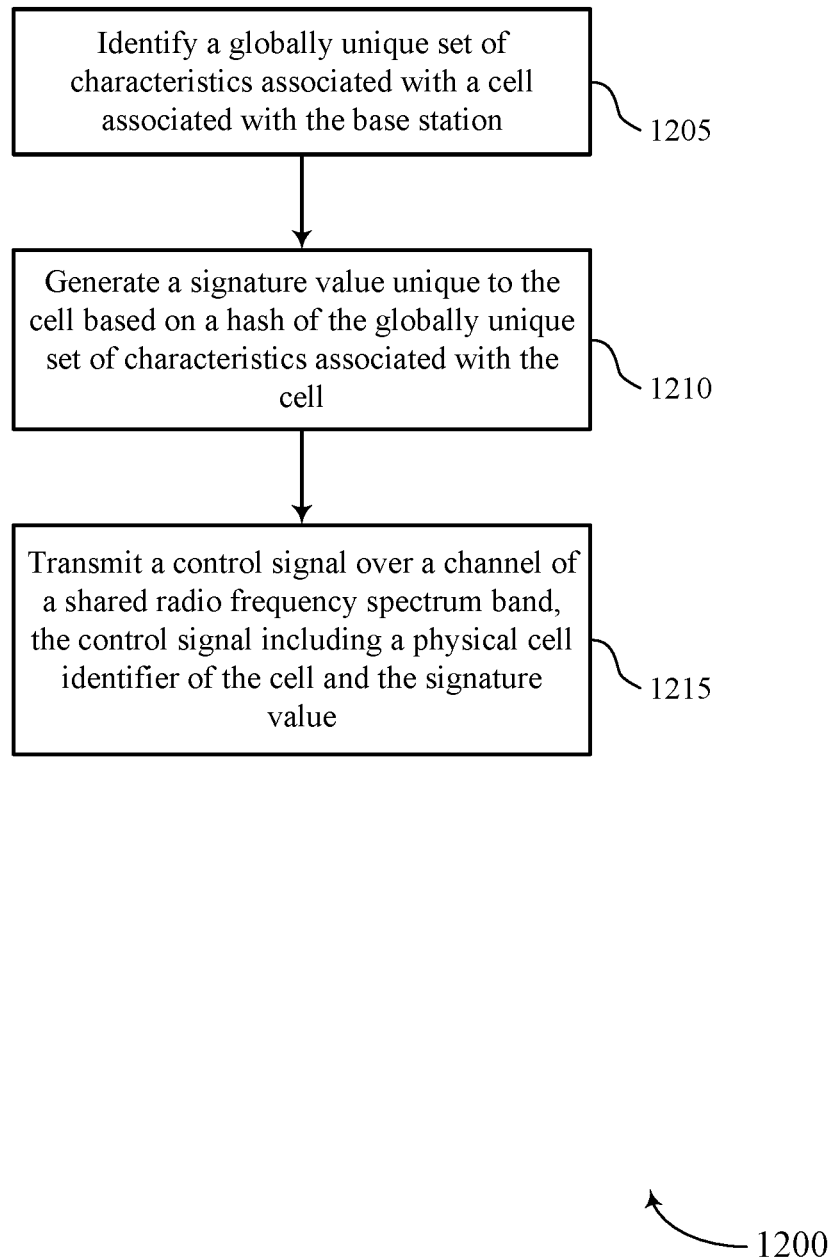
FIGS. 12 through 15 show flowcharts illustrating methods that support identification of cells in NR unlicensed in accordance with aspects of the present disclosure.

FIG. 12 shows a flowchart illustrating a method 1200 that supports identification of cells in NR unlicensed in accordance with aspects of the present disclosure. The operations of method 1200 may be implemented by a base station 105 or its components as described herein. For example, the operations of method 1200 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1205, the base station may identify a globally unique set of characteristics associated with a cell associated with the base station. The operations of 1205 may be performed according to the methods described herein. In some examples, aspects of the operations of 1205 may be performed by a characteristic manager as described with reference to FIGS. 8 through 11.

At 1210, the base station may generate a signature value unique to the cell based on a hash of the globally unique set of characteristics associated with the cell. The operations of 1210 may be performed according to the methods described herein. In some examples, aspects of the operations of 1210 may be performed by a hash manager as described with reference to FIGS. 8 through 11.

At 1215, the base station may transmit a control signal over a channel of a shared radio frequency spectrum band, the control signal including a physical cell identifier of the cell and the signature value. The operations of 1215 may be performed according to the methods described herein. In some examples, aspects of the operations of 1215 may be performed by a control signal manager as described with reference to FIGS. 8 through 11.

Figure 13:
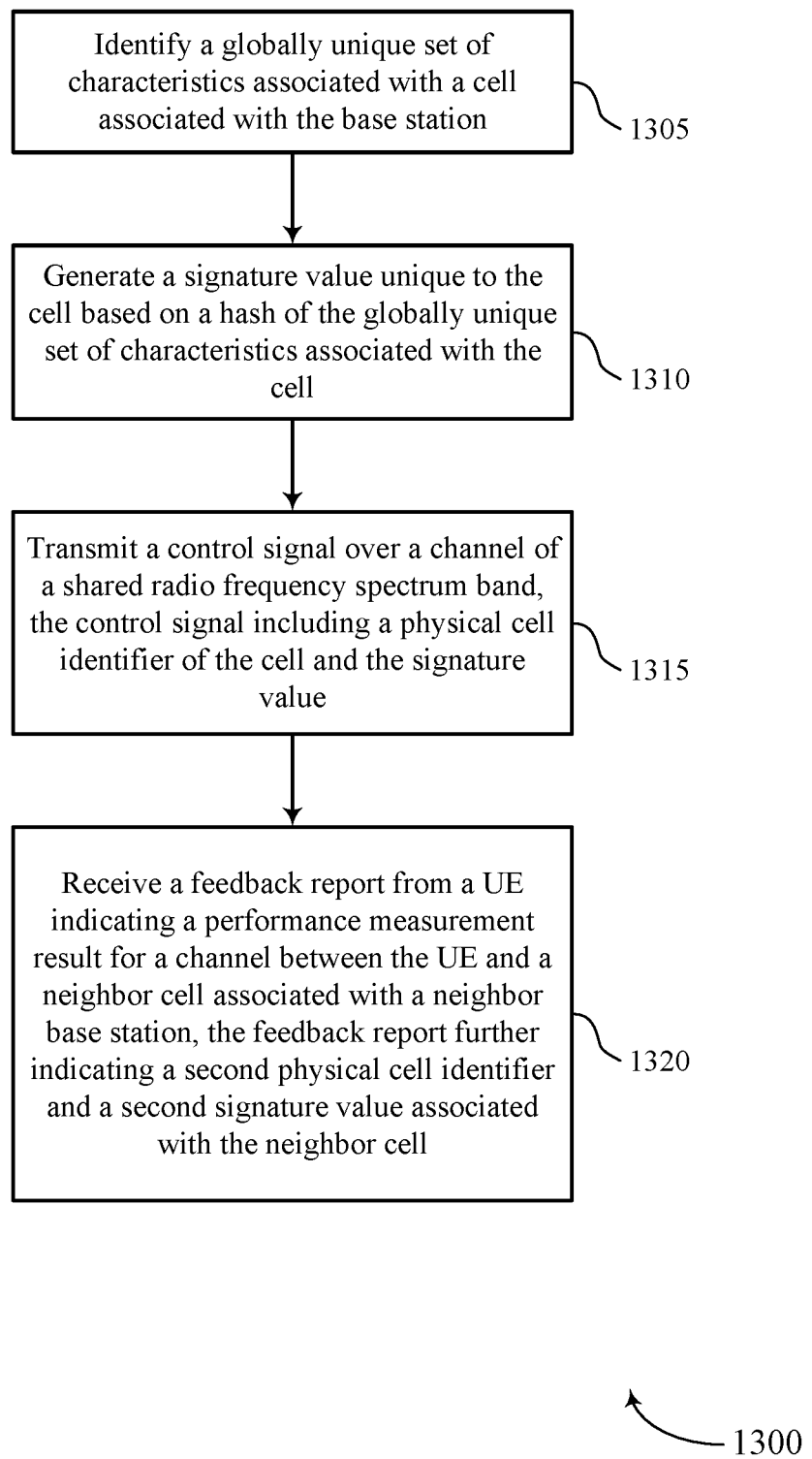

FIG. 13 shows a flowchart illustrating a method 1300 that supports identification of cells in NR unlicensed in accordance with aspects of the present disclosure. The operations of method 1300 may be implemented by a base station 105 or its components as described herein. For example, the operations of method 1300 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1305, the base station may identify a globally unique set of characteristics associated with a cell associated with the base station. The operations of 1305 may be performed according to the methods described herein. In some examples, aspects of the operations of 1305 may be performed by a characteristic manager as described with reference to FIGS. 8 through 11.

At 1310, the base station may generate a signature value unique to the cell based on a hash of the globally unique set of characteristics associated with the cell. The operations of 1310 may be performed according to the methods described herein. In some examples, aspects of the operations of 1310 may be performed by a hash manager as described with reference to FIGS. 8 through 11.

At 1315, the base station may transmit a control signal over a channel of a shared radio frequency spectrum band, the control signal including a physical cell identifier of the cell and the signature value. The operations of 1315 may be performed according to the methods described herein. In some examples, aspects of the operations of 1315 may be performed by a control signal manager as described with reference to FIGS. 8 through 11.

At 1320, the base station may receive a feedback report from a UE indicating a performance measurement result for a channel between the UE and a neighbor cell associated with a neighbor base station, the feedback report further indicating a second physical cell identifier and a second signature value associated with the neighbor cell. The operations of 1320 may be performed according to the methods described herein. In some examples, aspects of the operations of 1320 may be performed by a feedback manager as described with reference to FIGS. 8 through 11.

Figure 14:
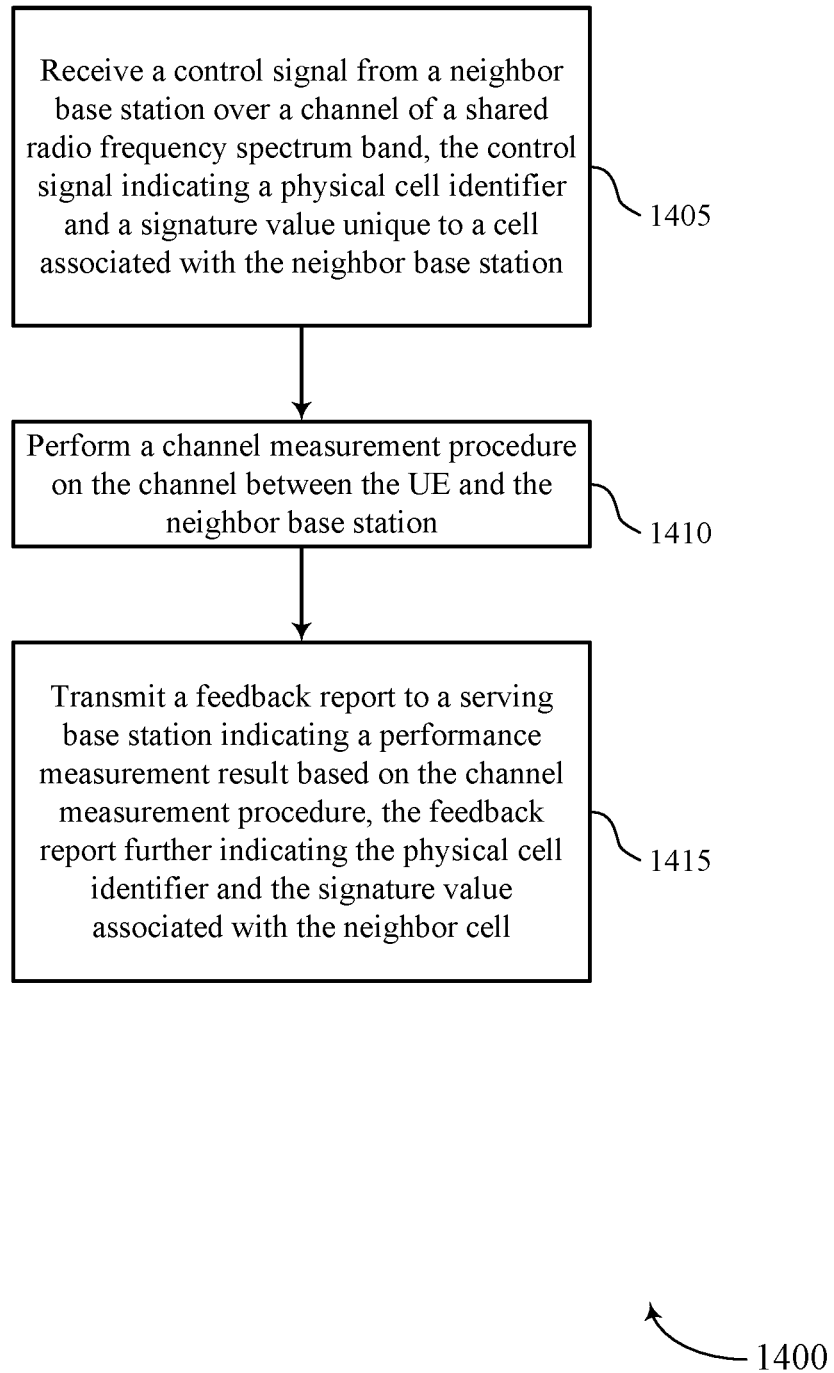

FIG. 14 shows a flowchart illustrating a method 1400 that supports identification of cells in NR unlicensed in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may receive a control signal from a neighbor base station over a channel of a shared radio frequency spectrum band, the control signal indicating a physical cell identifier and a signature value unique to a cell associated with the neighbor base station. The operations of 1405 may be performed according to the methods described herein. In some examples, aspects of the operations of 1405 may be performed by a control signal manager as described with reference to FIGS. 4 through 7.

At 1410, the UE may perform a channel measurement procedure on the channel between the UE and the neighbor base station. The operations of 1410 may be performed according to the methods described herein. In some examples, aspects of the operations of 1410 may be performed by a channel measurement manager as described with reference to FIGS. 4 through 7.

At 1415, the UE may transmit a feedback report to a serving base station indicating a performance measurement result based on the channel measurement procedure, the feedback report further indicating the physical cell identifier and the signature value associated with the neighbor cell. The operations of 1415 may be performed according to the methods described herein. In some examples, aspects of the operations of 1415 may be performed by a feedback manager as described with reference to FIGS. 4 through 7.

Figure 15:
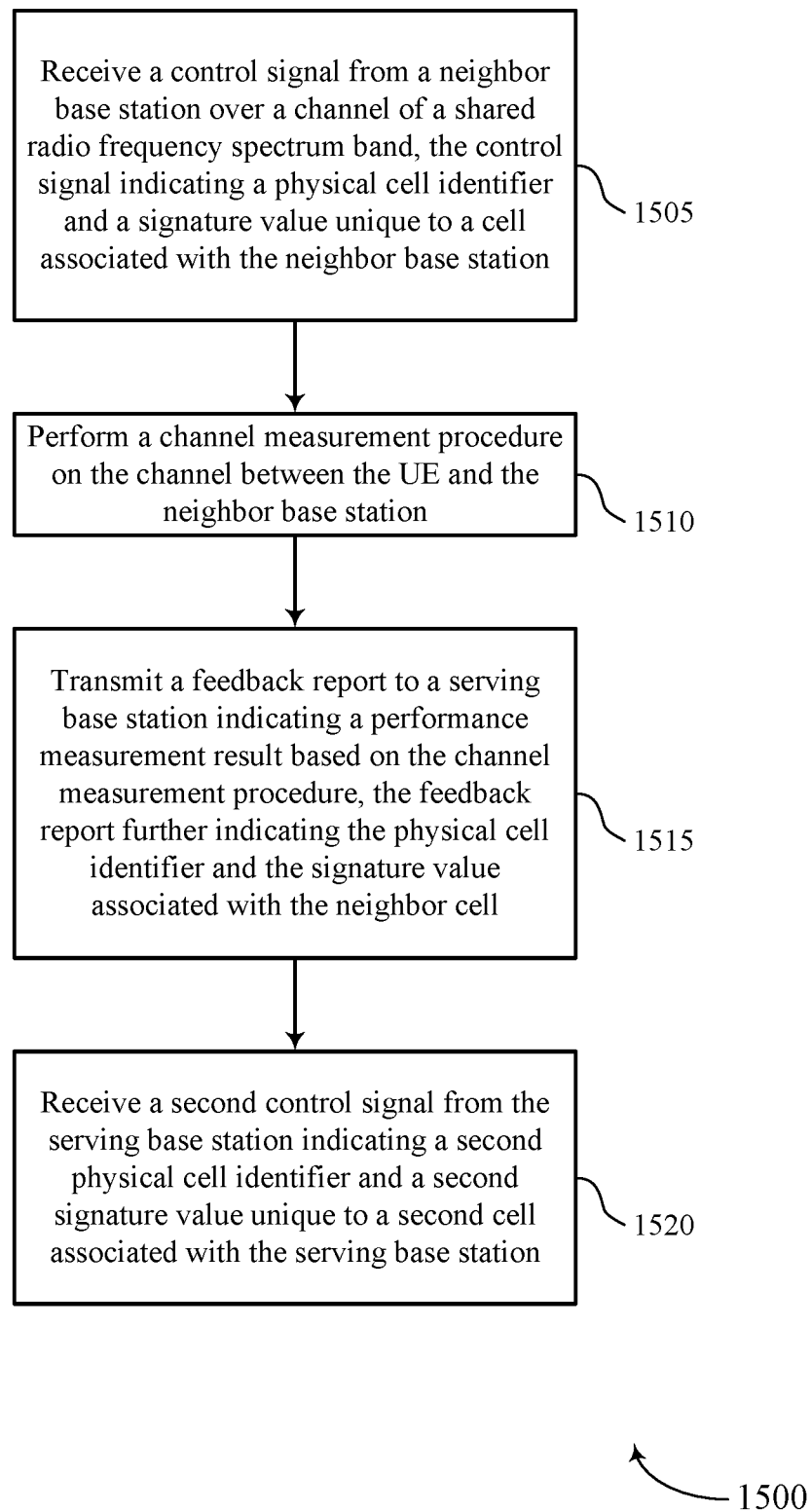

FIG. 15 shows a flowchart illustrating a method 1500 that supports identification of cells in NR unlicensed in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1505, the UE may receive a control signal from a neighbor base station over a channel of a shared radio frequency spectrum band, the control signal indicating a physical cell identifier and a signature value unique to a cell associated with the neighbor base station. The operations of 1505 may be performed according to the methods described herein. In some examples, aspects of the operations of 1505 may be performed by a control signal manager as described with reference to FIGS. 4 through 7.

At 1510, the UE may perform a channel measurement procedure on the channel between the UE and the neighbor base station. The operations of 1510 may be performed according to the methods described herein. In some examples, aspects of the operations of 1510 may be performed by a channel measurement manager as described with reference to FIGS. 4 through 7.

At 1515, the UE may transmit a feedback report to a serving base station indicating a performance measurement result based on the channel measurement procedure, the feedback report further indicating the physical cell identifier and the signature value associated with the neighbor cell. The operations of 1515 may be performed according to the methods described herein. In some examples, aspects of the operations of 1515 may be performed by a feedback manager as described with reference to FIGS. 4 through 7.

At 1520, the UE may receive a second control signal from the serving base station indicating a second physical cell identifier and a second signature value unique to a second cell associated with the serving base station. The operations of 1520 may be performed according to the methods described herein. In some examples, aspects of the operations of 1520 may be performed by a serving cell manager as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a network device, comprising:

identifying a globally unique set of characteristics associated with a cell associated with the network device, wherein the globally unique set of characteristics comprise at least one of: a primary network operator identifier, a secondary network operator identifier, a supported network operator identifier, a subscriber group identifier, a channel identifier, a bandwidth, a sub-band, or a combination thereof;

generating a signature value unique to the cell based at least in part on a hash of the globally unique set of characteristics associated with the cell; and transmitting a control signal over a channel of a shared radio frequency spectrum band, the control signal comprising a physical cell identifier of the cell and the signature value, wherein the physical cell identifier and the signature value identify the cell and distinguish the cell from a neighbor cell having a second physical cell identifier that is a same value as the physical cell identifier.

2. The method of claim 1, further comprising:

receiving a feedback report from a user equipment (UE) indicating a performance measurement result for a channel between the UE and the neighbor cell associated with a neighbor network device, the feedback report further indicating the second physical cell identifier and a second signature value associated with the neighbor cell.

3. The method of claim 2, further comprising:
changing, based at least in part on the second physical cell identifier, the second signature value, the second physical cell identifier associated, or a combination thereof, with the neighbor cell to a different value.

4. The method of claim 2, further comprising:
exchanging, via a backhaul interface, the signature value and the second signature value with the neighbor network device.

5. The method of claim 4, further comprising:
coordinating with the neighbor network device to change the second physical cell identifier to a different value.

6. The method of claim 2, further comprising:
transmitting a second control signal that indicates the second physical cell identifier and the second signature value associated with the neighbor cell.

7. The method of claim 6, wherein the second control signal is transmitted in at least one of: a system information block broadcast, a radio resource control signal transmission, or a combination thereof.

8. The method of claim 1, further comprising:
transmitting the control signal in at least one of: a broadcast transmission, a multi-cast transmission, a physical layer transmission, a reference signal transmission, a synchronization signal transmission, a system information block broadcast, or a combination thereof.

9. A method for wireless communications at a user equipment (UE), comprising:
receiving a control signal from a neighbor network device over a channel of a shared radio frequency spectrum band, the control signal indicating a physical cell identifier and a signature value unique to a neighbor cell associated with the neighbor network device, wherein the signature value is based at least in part on a hash of a globally unique set of characteristics that comprise at least one of: a primary network operator identifier, a secondary network operator identifier, a supported network operator identifier, a subscriber group identifier, a channel identifier, a bandwidth, a sub-band, or a combination thereof;
performing a channel measurement procedure on the channel between the UE and the neighbor network device; and
transmitting a feedback report to a serving network device indicating a performance measurement result based on the channel measurement procedure, the feedback report further indicating the physical cell identifier and the signature value, wherein the physical cell identifier and the signature value identify the neighbor cell and distinguish the neighbor cell from a serving cell associated with the serving network device having a second physical cell identifier that is a same value as the physical cell identifier.

10. The method of claim 9, further comprising:
determining, based at least in part on a result of the channel measurement procedure, that the channel between UE and the neighbor network device satisfies a performance threshold level; and
configuring the feedback report to indicate that the channel satisfies the performance threshold level.

11. The method of claim 9, further comprising:
receiving a second control signal from the serving network device indicating the second physical cell identifier and a second signature value unique to the serving cell associated with the serving network device.

12. The method of claim 9, wherein the control signal is received in at least one of: a broadcast transmission, a multi-cast transmission, a physical layer transmission, a reference signal transmission, a synchronization signal transmission, a system information block broadcast, or a combination thereof.

13. An apparatus for wireless communications at a network device, comprising:
a processor,
memory in electronic communication with the processor; and
instructions stored in the memory and executable by the processor to cause the apparatus to:
identify a globally unique set of characteristics associated with a cell associated with the network device, wherein the globally unique set of characteristics comprise at least one of: a primary network operator identifier, a secondary network operator identifier, a supported network operator identifier, a subscriber group identifier, a channel identifier, a bandwidth, a sub-band, or a combination thereof;
generate a signature value unique to the cell based at least in part on a hash of the globally unique set of characteristics associated with the cell; and
transmit a control signal over a channel of a shared radio frequency spectrum band, the control signal comprising a physical cell identifier of the cell and the signature value, wherein the physical cell identifier of the cell and the signature value identify the cell and distinguish the cell from a neighbor cell having a second physical cell identifier that is a same value as the physical cell identifier.

14. The apparatus of claim 13, wherein the instructions are further executable by the processor to cause the apparatus to:
receive a feedback report from a user equipment (UE) indicating a performance measurement result for a channel between the UE and the neighbor cell associated with a neighbor network device, the feedback report further indicating the second physical cell identifier and a second signature value associated with the neighbor cell.

15. The apparatus of claim 14, wherein the instructions are further executable by the processor to cause the apparatus to:
change, based at least in part on the second physical cell identifier, the second signature value, the second physical cell identifier, or a combination thereof, associated with the neighbor cell to a different value.

16. The apparatus of claim 14, wherein the instructions are further executable by the processor to cause the apparatus to:
exchange, via a backhaul interface, the signature value and the second signature value with the neighbor network device.

17. The apparatus of claim 16, wherein the instructions are further executable by the processor to cause the apparatus to:
coordinate with the neighbor network device to change the second physical cell identifier to a different value.

18. The apparatus of claim 14, wherein the instructions are further executable by the processor to cause the apparatus to:

transmit a second control signal that indicates the second physical cell identifier and the second signature value associated with the neighbor cell.

19. The apparatus of claim 18, wherein the second control signal is transmitted in at least one of a system information block broadcast, a radio resource control signal transmission, or a combination thereof.

20. The apparatus of claim 13, wherein the instructions are further executable by the processor to cause the apparatus to:
transmit the control signal in at least one of: a broadcast transmission, a multi-cast transmission, a physical layer transmission, a reference signal transmission, a synchronization signal transmission, a system information block broadcast, or a combination thereof.

21. An apparatus for wireless communications at a user equipment (UE), comprising:
a processor,
memory in electronic communication with the processor; and
instructions stored in the memory and executable by the processor to cause the apparatus to:
receive a control signal from a neighbor network device over a channel of a shared radio frequency spectrum band, the control signal indicating a physical cell identifier and a signature value unique to a neighbor cell associated with the neighbor network device, wherein the signature value is based at least in part on a hash of a globally unique set of characteristics that comprise at least one of: a primary network operator identifier, a secondary network operator identifier, a supported network operator identifier, a subscriber group identifier, a channel identifier, a bandwidth, a sub-band, or a combination thereof;
perform a channel measurement procedure on the channel between the UE and the neighbor network device; and
transmit a feedback report to a serving network device indicating a performance measurement result based on the channel measurement procedure, the feedback report further indicating the physical cell identifier and the signature value, wherein the physical cell identifier and the signature value identify the neighbor cell and distinguish the neighbor cell from a serving cell associated with the serving network device having a second physical cell identifier that is a same value as the physical cell identifier.

22. The apparatus of claim 21, wherein the instructions are further executable by the processor to cause the apparatus to:
determine, based at least in part on a result of the channel measurement procedure, that the channel between UE and the neighbor network device satisfies a performance threshold level; and
configure the feedback report to indicate that the channel satisfies the performance threshold level.

23. The apparatus of claim 21, wherein the instructions are further executable by the processor to cause the apparatus to:
receive a second control signal from the serving network device indicating the second physical cell identifier and a second signature value unique to the serving cell associated with the serving network device.

24. The apparatus of claim 21, wherein the control signal is received in at least one of a broadcast transmission, a multi-cast transmission, a physical layer transmission, a reference signal transmission, a synchronization signal transmission, a system information block broadcast, or a combination thereof.

* * * * *